United States Patent
Nolan et al.

(10) Patent No.: US 7,013,257 B1
(45) Date of Patent: Mar. 14, 2006

(54) COMMUNICATION TRANSMISSION IMPAIRMENT EMULATOR

(75) Inventors: James Nolan, Huntington, NY (US); Leonid Kazakevich, Plainview, NY (US); Fryderyk Tyra, Huntington Station, NY (US); Robert Regis, Huntington, NY (US); Fred Schreider, Commack, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 863 days.

(21) Appl. No.: 09/712,888

(22) Filed: Nov. 15, 2000

Related U.S. Application Data

(60) Provisional application No. 60/219,894, filed on Jul. 21, 2000.

(51) Int. Cl.
*G06F 9/455* (2006.01)

(52) U.S. Cl. ............... 703/28; 703/2; 716/5; 375/224; 370/248; 370/249; 370/252; 379/22.01; 379/22.08; 379/27.04; 379/29.02

(58) Field of Classification Search ............... 714/712, 714/713, 714, 715, 716, 717, 735, 736, 741; 703/2, 21, 23, 28; 716/5; 370/201, 248, 370/249, 252, 254; 327/570; 379/22.01, 379/22.08, 27.04, 29.02, 21, 24, 27.01; 375/224
See application file for complete search history.

(56) References Cited

U.S. PATENT DOCUMENTS

| | | | |
|---|---|---|---|
| 3,956,601 A | * | 5/1976 | Harris et al. ................... 379/21 |
| 5,163,051 A | * | 11/1992 | Biessman et al. ........... 714/704 |
| 5,539,772 A | | 7/1996 | Fasulo, II et al. .......... 375/224 |
| 5,751,766 A | | 5/1998 | Kletsky et al. ............. 375/224 |
| 5,794,126 A | | 8/1998 | Tsutsumi et al. ............. 455/40 |
| 5,794,128 A | | 8/1998 | Brockel et al. .......... 455/67.11 |
| 5,862,362 A | * | 1/1999 | Somasegar et al. ........... 703/21 |

(Continued)

OTHER PUBLICATIONS

Wolfgang Kufer, Reduced costs through baseband simulation, News from Rohde & Schwarz, No.163 (1999/III), pp. 11-12.

New approaches in the generation of complex I/Q signals, 2 pages.

(Continued)

*Primary Examiner*—Russell Frejd
(74) *Attorney, Agent, or Firm*—Volpe and Koenig, P.C.

(57) ABSTRACT

A communication system emulator digitally emulates a plurality of signal impairments created by the transmitter and receiver components and communication medium in a typical communication system, for use in evaluating and refining modem design. A variety of linear and non-linear distortion characteristics are impressed on baseband signals between modulators and demodulators to evaluate and refine modem performance without requiring transmission frequency components or communication channel. The emulator comprises transmit modules, receive modules and communication media modules, and can accept or output analog or digital signals. Each module is configurable to allow modeling of simplex or duplex communication, or a common base station with multiple users transmitting or receiving, all configurations with or without communication media impairment emulation. Each module can be configured to add a plurality of linear and non-linear impairments to a baseband signal.

21 Claims, 29 Drawing Sheets

U.S. PATENT DOCUMENTS

| | | | | |
|---|---|---|---|---|
| 5,881,066 A | * | 3/1999 | Lepitre | 714/716 |
| 6,002,671 A | * | 12/1999 | Kahkoska et al. | 370/248 |
| 6,061,393 A | * | 5/2000 | Tsui et al. | 375/224 |
| 6,374,375 B1 | * | 4/2002 | Yip et al. | 714/715 |
| 6,442,141 B1 | * | 8/2002 | Borella et al. | 370/248 |
| 6,466,925 B1 | * | 10/2002 | Harald et al. | 706/16 |

OTHER PUBLICATIONS

Kufer, "Reduced Costs Through Baseband Simulation", News from Rohde & Schwarz, No.163(1999/III). pp. 11-12. New approachees in the generation of complex 1/Q signals, 2 pages.

* cited by examiner

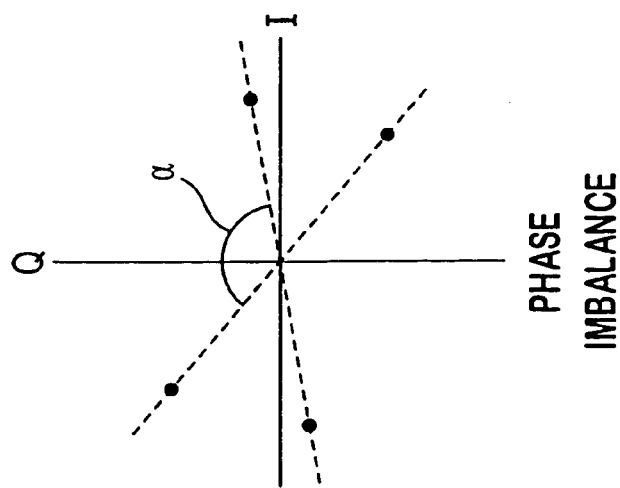
FIG. 2C PHASE IMBALANCE
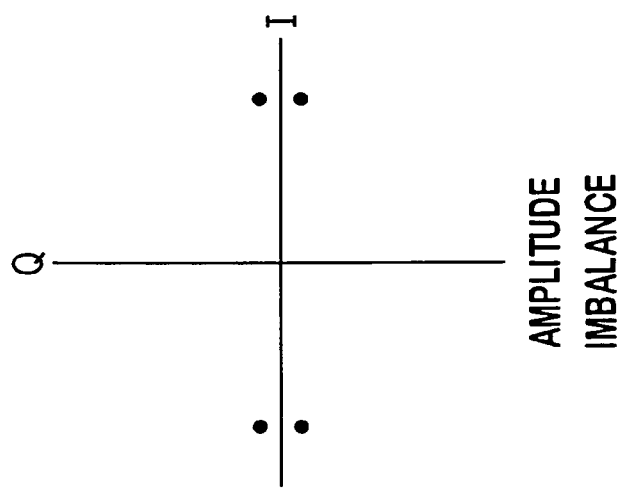
FIG. 2B AMPLITUDE IMBALANCE
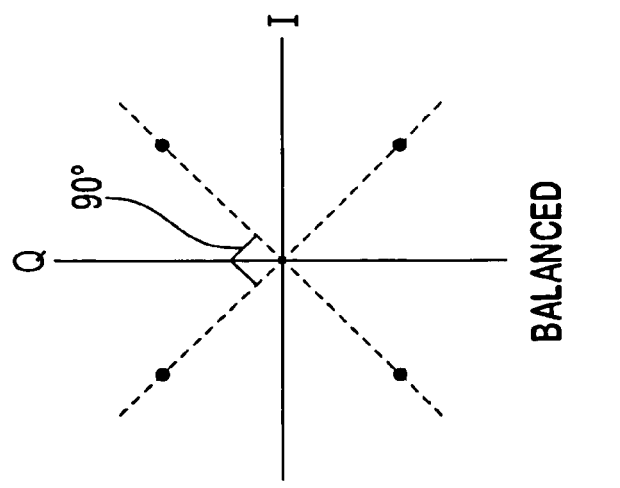
FIG. 2A BALANCED LINEAR IMPAIRMENTS MENU
- AMPLITUDE
  - IMBALANCE (VARIABLE IN dB)
    - DYNAMIC
      - ~
      - SWEPT ~
      - ⎍
      - ⋀⋀
      - ⊥
- BANDWIDTH
  - GROUP DELAY (VARIABLE IN µS V. Hz)
  - BANDWIDTH LIMITATIONS (VARIABLE IN dB V. Hz)
    - LPF
    - HPF (dc BLOCKING)
- CARRIER
  - FREQUENCY OFFSET (VARIABLE IN Hz)
    - DYNAMIC
      - ~
      - SWEPT ~
      - ⎍
      - ⋀⋀
      - ⊥
  - dc OFFSET (RECEIVER) (VARIABLE IN dBm)
    - DYNAMIC
      - ~
      - SWEPT ~
      - ⎍
      - ⋀⋀
      - ⊥

COMMUNICATION TRANSMISSION IMPAIRMENT EMULATOR

This application claims the benefit of Provisional Application No. 60/219,894, filed Jul. 21, 2000.

BACKGROUND OF THE INVENTION

1. Field of the Invention

The present invention relates generally to analog and digital communication systems. More specifically, the invention relates to a system and method for emulating signal impairments which manifest themselves during signal conversion and transmission.

2. Description of the Related Art

In simple terms, a communication system transmits information from a source to a destination. The information signal is transmitted from the source to the destination over an appropriate medium which may be guided or unguided, comprising copper, optical fiber or air and is commonly referred to as the communication channel. To use the channel for transportation, the information signal must be altered to match the characteristics of the channel which is referred to as modulation. The recovery of the information-bearing signal is called demodulation. The demodulation step converts the transported signal using the logical inverse of the modulation process.

A prior art communication system is shown in FIG. 1. The communication system in FIG. 1 shows a single direction communication link for a data signal from one location (user 1) to another (user 2). The prior art system comprises a transmit modem, an up-converter or transmitter, a communication medium, a down-converter or receiver and a receive modem. The transmit modem accepts a data input and produces a modulated digital or analog baseband output according to the chosen modulation scheme. The modulated data is input to the transmitter where it is upconverted onto a predefined carrier frequency and output to the communication medium. The receiver and receive modem perform a similar inverse operation.

Deployed communication systems rarely are single access. Protocols such as time division multiple access (TDMA), carrier sense multiple access (CSMA), code division multiple access (CDMA) and frequency based protocols such as frequency division multiple access (FDMA) and orthogonal frequency division multiplexing (OFDM) allow access to the same communication channel for more than one user. These techniques can be mixed together creating hybrid varieties of multiple access schemes such as time division duplex (TDD). The access protocol specified by a communication system is typically executed after the data undergoes modulation.

Prior art modulation techniques that are in use are frequency modulation (FM), frequency shift keying (FSK), phase shift keying (PSK), binary phase shift keying (BPSK) and differential phase shift keying (DPSK). The most commonly used high-speed methods for data modulation are quadrature amplitude modulation (QAM) and quadrature phase shift keying (QPSK). These techniques vary a predefined carrier frequency amplitude and phase according to an input signal to transmit multiple bits per baud thereby using available bandwidth more efficiently.

To extend the possible range of data signal values, quadrature modulation assigns a symbol to represent more than two binary values. The concept of a symbol allows for a greater degree of transmitted information since the bit content of each symbol dictates a unique pulse shape. Symbols, which encode x bits per symbol may represent a quantized version of an analog sample or digital data. Depending upon the number of symbols used, an equal number of unique pulse or wave shapes exist. The number of data bits determine the combinations of amplitude and phase that define a constellation pattern.

Quadrature modulation is based on two distinct carrier waveforms that are orthogonal to each other. If two waveforms are transmitted simultaneously and do not interfere with each other, they are orthogonal. Quadrature modulation modulates two different signals into the same bandwidth creating a two-dimensional signal space as shown in FIG. 2a. Two waveforms generally used for quadrature modulation are sine and cosine waveforms at the same frequency. The waveforms are defined as $$s_1(t) = a_1 \cos(2\pi f_c t) \quad (1)$$

$$s_2(t) = a_2 \sin(2\pi f_c t) \quad (2)$$

where $f_c$ is the carrier frequency of the modulated signal and $a_1$ and $a_2$ are the amplitudes applied to the cosine and sine signals respectively. By convention, the cosine carrier is called the in-phase, real component I of the signal and the sine carrier is the quadrature, imaginary component Q of the signal. Linear combinations of the form $a_1 \cos(2\pi f_c t) + a_2 \sin(2\pi f_c t)$ (where $a_1$ and $a_2$ are real numbers) generated from the two basic waveforms define symbols in the modulation alphabet. The symbols can be represented as complex numbers, $a_1 + ja_2$, where j is defined as $j = \sqrt{-1}$.

A QAM symbol consists of at least one sample from both the in-phase I and quadrature Q signals. Signal amplitude is indicated by the distance from the origin; phase by the angular distance around the unit circle. After the data is assembled as symbols, the symbols are further processed in accordance with the access protocol chosen for the communication system.

The above processing is typically performed in a modem. Afterwards, a predefined carrier frequency is modulated with the baseband output from the modem, amplified and transmitted in the communication medium. Upconversion is required when the channel frequencies are above baseband frequencies. Transmission through a medium is accomplished by converting the modem output signal amplitude, frequency or phase to an operating region between $10^4$ to $10^8$ Hz using radio frequency amplifiers, $10^8$ to $10^{11}$ Hz using microwave frequency amplification and $10^{11}$ to $10^{16}$ Hz using optical frequency amplification. Reception of the communication transmission is by downconversion.

Modulation schemes that rely upon phase must overcome the inevitable problem of phase synchronization. For proper signaling, the I and Q channels should have the same gain when processing both received channels, keeping the I and Q channels uncorrelated. Mismatched signal gains or magnitudes between the uncorrelated I and Q channels create errors when processing. Phase differences other than 90 degrees between the carrier waveform signals cause spillover between individual channels and similarly result in degraded performance. However, during carrier modulation (upconversion), transmission through the communication channel and carrier demodulation (downconversion), signal impairments occur.

Signal impairments which manifest themselves during the conversion processes are gain and phase variations in the separate I and Q channels. This is due in part to the plurality of electronic mixers, filters, A/D converters, etc., employed in the design of up and downconverters. Each component contributes its own variation in specified value due to temperature, manufacturing tolerances and other factors until the variations taken as a whole significantly affect signal integrity. Amplitude and phase imbalance between the I and Q channels result in the constellation distortions shown in FIGS. 2b and 2c, decreasing overall signal-to-noise ratio (SNR).

Of these impairments, amplitude and phase impairments are linear distortions. Other significant linear impairments which manifest themselves in a data signal during carrier frequency modulation and demodulation comprise: carrier frequency offset, caused by local (receiver) oscillator drift; carrier phase noise, impressed on the data signal by active devices in the signal path; communication channel bandwidth aberrations, caused by unintentional filtering; group delay variation and carrier amplitude imbalance.

Non-linear impairments are another adverse byproduct. Non-linear distortions are characterized by changes in output gain or phase which vary in dependence upon the input signal magnitude. The two major signal impairments include: amplitude-to-amplitude (AM—AM) distortion caused by non-linearities in the overall amplifier gain transfer function and amplitude-to-phase distortion (AM-PM conversion) distortion caused by amplitude dependent phase shifts.

In addition to the impairments brought about by up and downconversion, the communication media, whether guided or unguided, is under the influence of obstacles, attenuation and wave reflections. These perturbations affect signal level by many dB and continually change in a mobile communication operating environment. The propagation characteristics vary widely depending upon whether a communication link is fixed or mobile, the condition of the propagation path and the composition of the medium itself.

While designing and prototyping new communication systems, manufacturers routinely and thoroughly test the baseband modulation/demodulation components and the up/downconversions to and from the transmission channel operating frequencies. To validate a modem hardware design, prior art test techniques comprise signal generators, $E_b/N_o$ (ratio of carrier or bit energy to noise energy) generators and meters, channel emulators, etc. However, this method does not include the conversion components.

The prior art testing method suffers from two fundamental disadvantages. First, the method is not capable of evaluating a design at the baseband signaling frequencies since up/downconversion and transmission channel impairments are difficult to separate from algorithmic or other systemic deficiencies. Second, the prior art does not provide a modem-to-conversion and transmission medium evaluation interface prior to integration with actual hardware.

Accordingly, there exists a need for a system and method that allows for the evaluation of a complete transmit modem-to-receive modem system by simulating in the baseband impairments in signal quality manifested during signal conversion and within the transmission medium.

SUMMARY OF THE INVENTION

The present invention is a system and method that emulates a plurality of signal impairments created by transmission components and media that are employed in typical communication systems. During baseband signal upconversion, transmission through a communication channel, and downconversion, various linear and non-linear distortions manifest themselves in the communication signal. The present invention models a plurality of known linear and non-linear distortions to dynamically evaluate the performance of the transmit and receive modems without requiring empirical evaluation by using a combination of digital hardware and software for accurate, repeatable tests. A variety of linear and non-linear distortion characteristics are impressed on a modulated baseband data signal between transmit and receive modems to effect thorough testing and optimization of modem performance regardless of the modulation technique and access protocol used and without requiring actual transmission frequency components and/or the physical communication channel medium. The communication transmission emulator comprises transmit modules, receive modules and communication media modules. The transmission emulator is configurable to allow a single channel communication simulation; a full duplex communication simulation; a common base station receiver with multiple users transmitting simulation and a base station transmitter with multiple users receiving simulation, all configurations with or without media impairment modules. The communication media modules simulate multipath signal distortions, signal fading and delay for a chosen medium. Depending upon the simulation, each module type and number can be individually configured, adding a plurality of linear and non-linear impairments to the baseband signal along with delay components to evaluate and optimize modem design.

Accordingly, it is an object of the invention to digitally model the transmission components and communication media of a communication system.

It is another object of the invention to simulate impairments caused by non-ideal transmitters, receivers and communication media in a communications system.

Other objects and advantages of the system and method will become apparent to those skilled in the art after reading the detailed description of the preferred embodiment.

BRIEF DESCRIPTION OF THE DRAWINGS

FIG. 2a is a quadrature modulation constellation pattern with equal amplitude and phase.

FIG. 2b is a quadrature modulation constellation pattern showing amplitude imbalance.

FIG. 2c is a quadrature modulation constellation pattern showing phase imbalance.

FIGS. 5a–5c is a transmit and receive module linear impairment emulation menu.

DETAILED DESCRIPTION OF THE INVENTION

Figure 1:
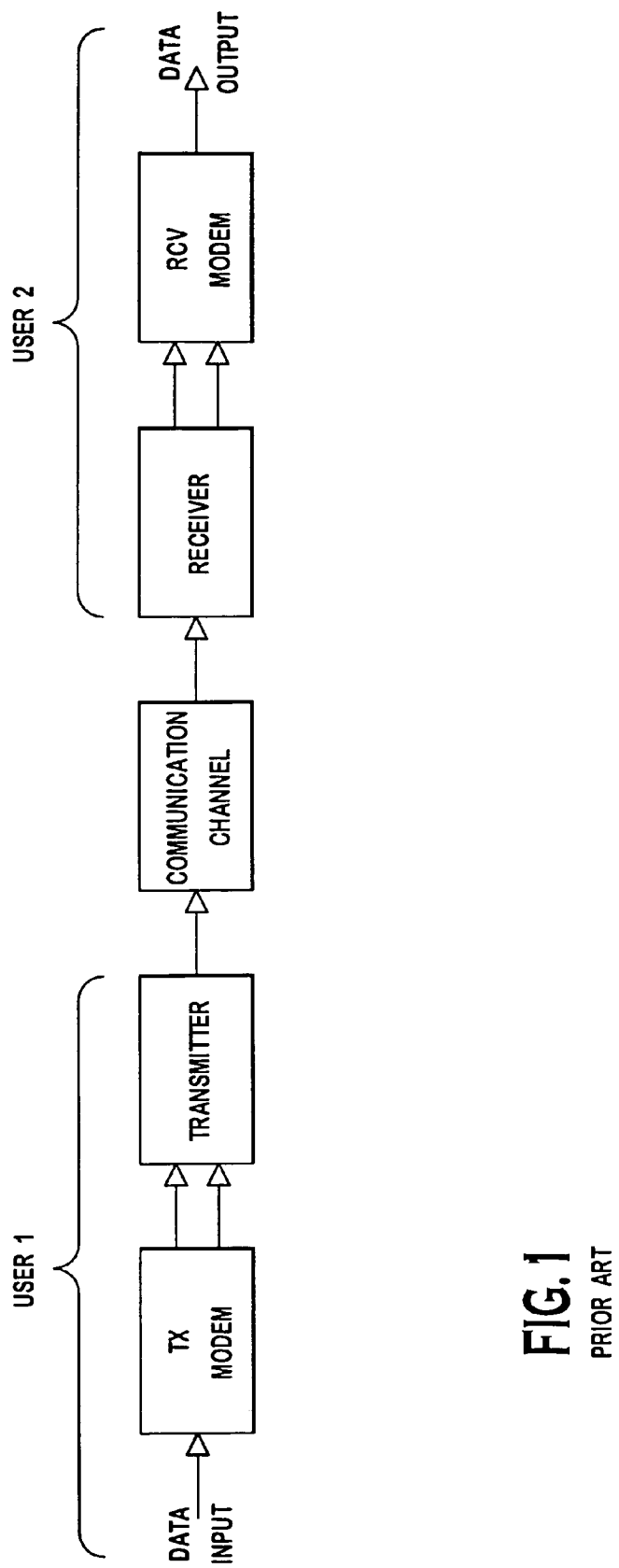
FIG. 1 is a simplified block diagram of an exemplary, prior art communication system.

The embodiments will be described with reference to the drawing figures where like numerals represent like elements throughout.

Figure 3:
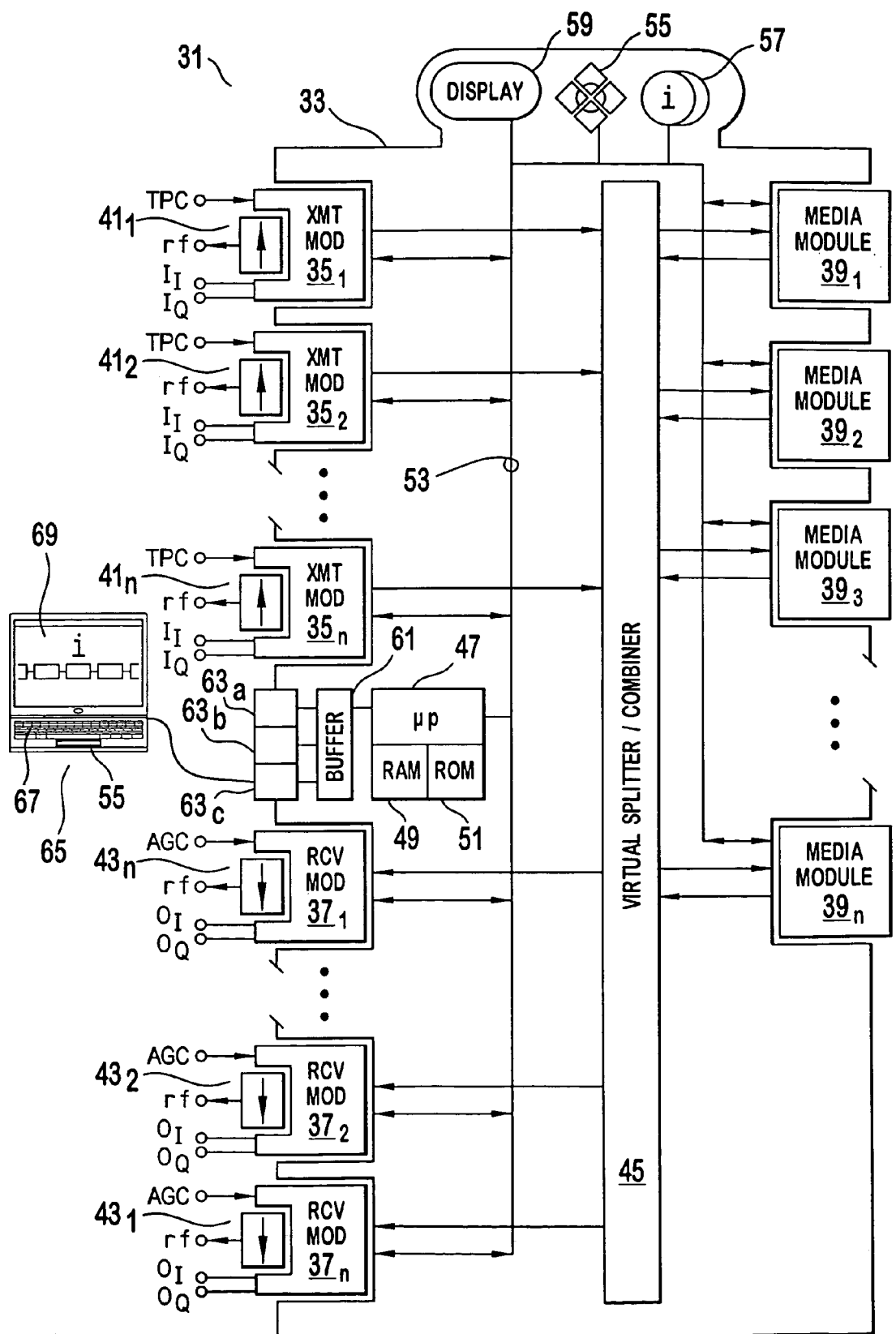
FIG. 3 is a block diagram of the present invention.

Shown in FIG. 3 is the communication transmission emulator of the present invention 31. The emulator 31 comprises a frame 33 and three addressable, configurable module groups: 1) transmit channel modules $35_1, 35_2, \ldots 35_n$, 2) receive channel modules $37_1, 37_2, \ldots 37_n$, and 3) communication channel media modules $39_1, 39_2, 39_3, \ldots 39_n$. Each transmit $35_1, 35_2, \ldots 35_n$ and receive $37_1, 37_2, \ldots 37_n$ channel module has an external input $I_I, I_Q$ and output $O_I, O_Q$, respectively, for receiving a signal from or sending to the modulation and demodulation systems of modems under test. Transmit modules $35_1, 35_2, \ldots 35_n$ have an external input for receiving a transmit power control TPC signal from the modulation portion of a modem and receive modules have an external input for receiving an automatic gain control AGC signal from the demodulation portion of a modem. The data and control signal inputs and outputs are selectable for either analog or digital compatibility. The digital format chosen for the emulator 31 allows for multiplexed or separate I and Q multi-bit data streams with any modulation scheme that can be modeled in a two-dimensional signal space. For analog signal sources and outputs, the signals will be processed through internal A/D and D/A converters, respectively. The modules may be assembled from discrete components, field programmable gate arrays (FPGAs), application specific integrated circuits (ASICs) and the like.

Each transmit $35_1, 35_2, \ldots 35_n$ and receive $37_1, 37_2, \ldots 37_n$ channel module receives a programmable frequency up $41_1, 41_2, \ldots 41_n$ or down $43_1, 43_2, 43_n$ converter, respectively, for coupling with an external rf channel communication medium. The operation of the external communication media is beyond the scope of this disclosure.

To accommodate a plurality of modem testing simulations, a virtual splitter/combiner 45 soft couples each resident transmit $35_1, 35_2, \ldots 35_n$, receive $37_1, 37_2, \ldots 37_n$, and media $39_1, 39_2, 39_3, \ldots 39_n$ module in user defined simulations. Since the preferred embodiment of the present invention 31 is modular in construction, the number of modules, module types and rf up/down converters may vary. Alternate embodiments of the invention 31 may have a fixed number of modules and variations in module packaging. The emulator 31 is powered from an ac mains source with the line current reduced by an internal power supply adjustable for the country of use (not shown).

A microprocessor 47 with collateral RAM 49 and ROM 51 communicate with each transmit channel $35_1, 35_2, \ldots 35_n$, receive channel $37_1, 37_2, \ldots 37_n$, and communication channel media $39_1, 39_2, 39_3, \ldots 39_n$ module over a dedicated communication bus 53. The microprocessor 47 recognizes and acknowledges each resident module with a unique address. Onboard system configuration is performed by a user navigating through a plurality of menus using a pointing device 55, rotary pulser 57 and switch options with impairment menus displayed on a high resolution 59 display. Coupled to the microprocessor 47 and communication bus 53 is a buffer 61 that is coupled to external connectors 63a,b,c that are sized in matching correspondence with a serial RS-232 point-to-point interface, and IEEE-488 and USB communication buses. Other bus architectures known to those skilled in this art may be used. The communication buses 63a,b,c provide a data highway between the emulator 31 and a user's computer 65, or LAN or WAN (not shown) for remote system configuration.

The personal computer 65 running a Mac OS®, Linux®, Windows® or like operating environment executes an installed application program 67 required for remote simulation configuration, emulation module configuration and performance monitoring. The computer 65 handshakes and interrogates the emulator 31 via the communication bus 63c. When launched, the program 67 presents a graphic user interface or GUI 69 allowing a user access to assemble a simulation by choosing the type and number of modules, configure each module and provide soft interconnection between emulator 31 components. Module configuration comprises choosing specific impairment models for a given module type and entering impairment values by opening a series of dialog boxes having data entry areas and radio buttons, the GUI 69 prompting the user for information that the user fills in as-required. The impairment values are loaded into respective memory locations resident on the modules in-use. The user may also configure the emulator 31 using the command set available from the display 59. To control and provide repeatable tests, various testing simulations and module configuration parameters may be archived for later retrieval.

The application program 67 displays a menu from which the user selects the type and number of modules for a simulation. With the pointing device 55, clicking on a module icon (type) will open a dialog box showing allowable configuration options and a user controlled parameter list. The GUI 69 additionally provides an intuitive method for soft interconnection and configuration of each module type, and after configuration, acts as a control panel for the emulator 31 that visually replicates actual communication hardware. The testing simulation is accompanied with real-time empirical performance measurement and trending.

Figure 4A:
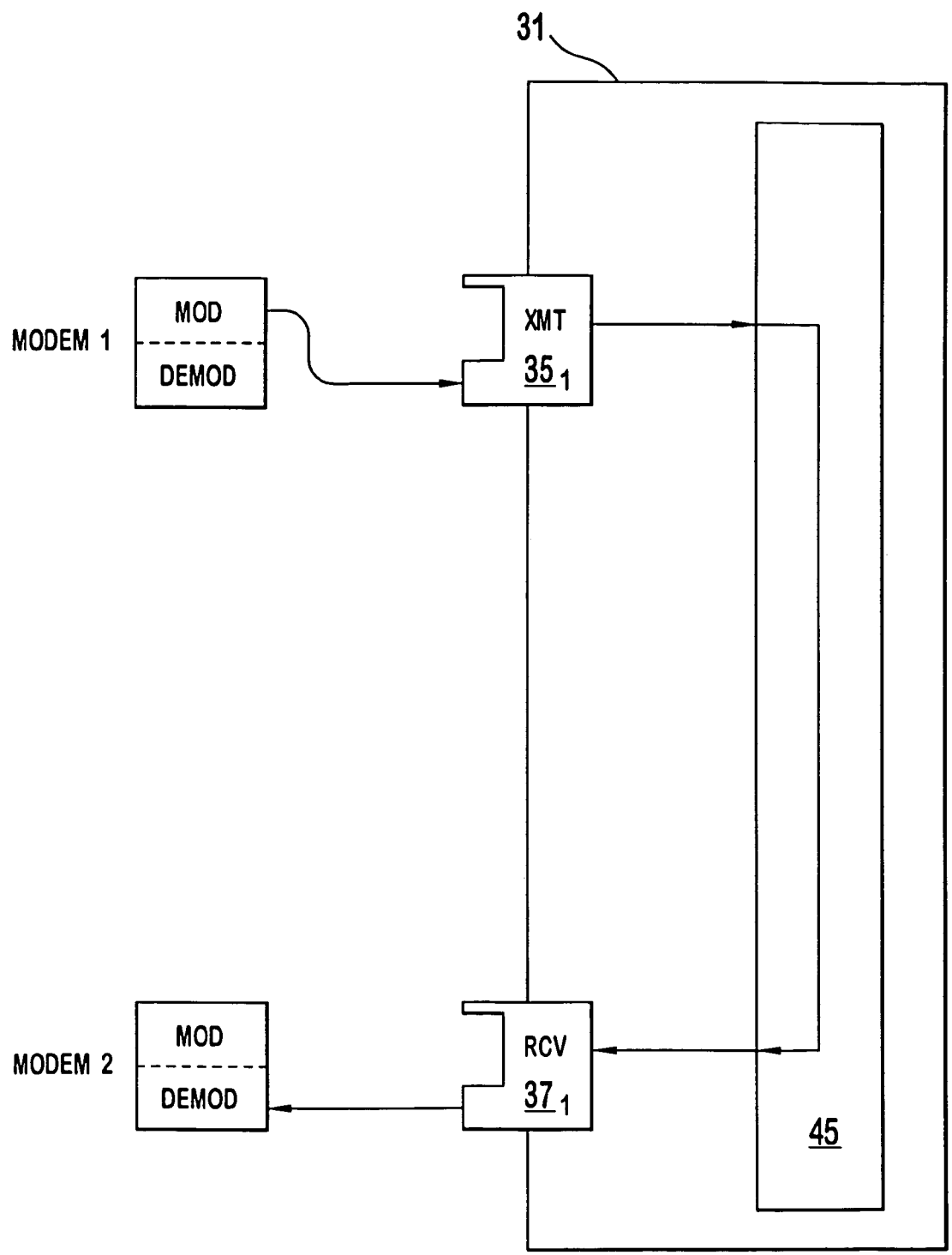
FIG. 4a is a block diagram of a single channel transmission simulation using the present invention.
Figure 4B:
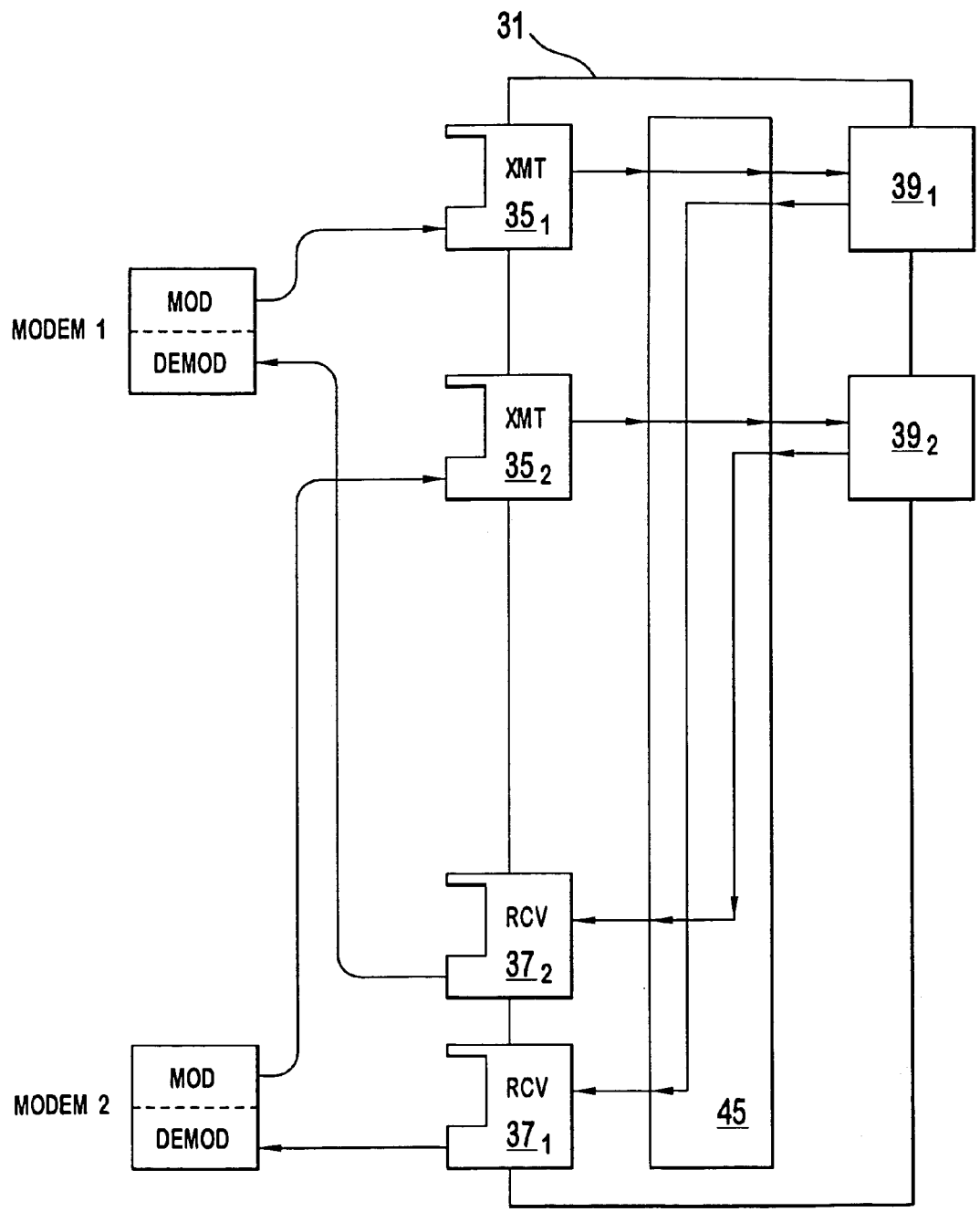
FIG. 4b is a block diagram of a dual channel transmission with media impairments using the present invention.
Figure 4C:
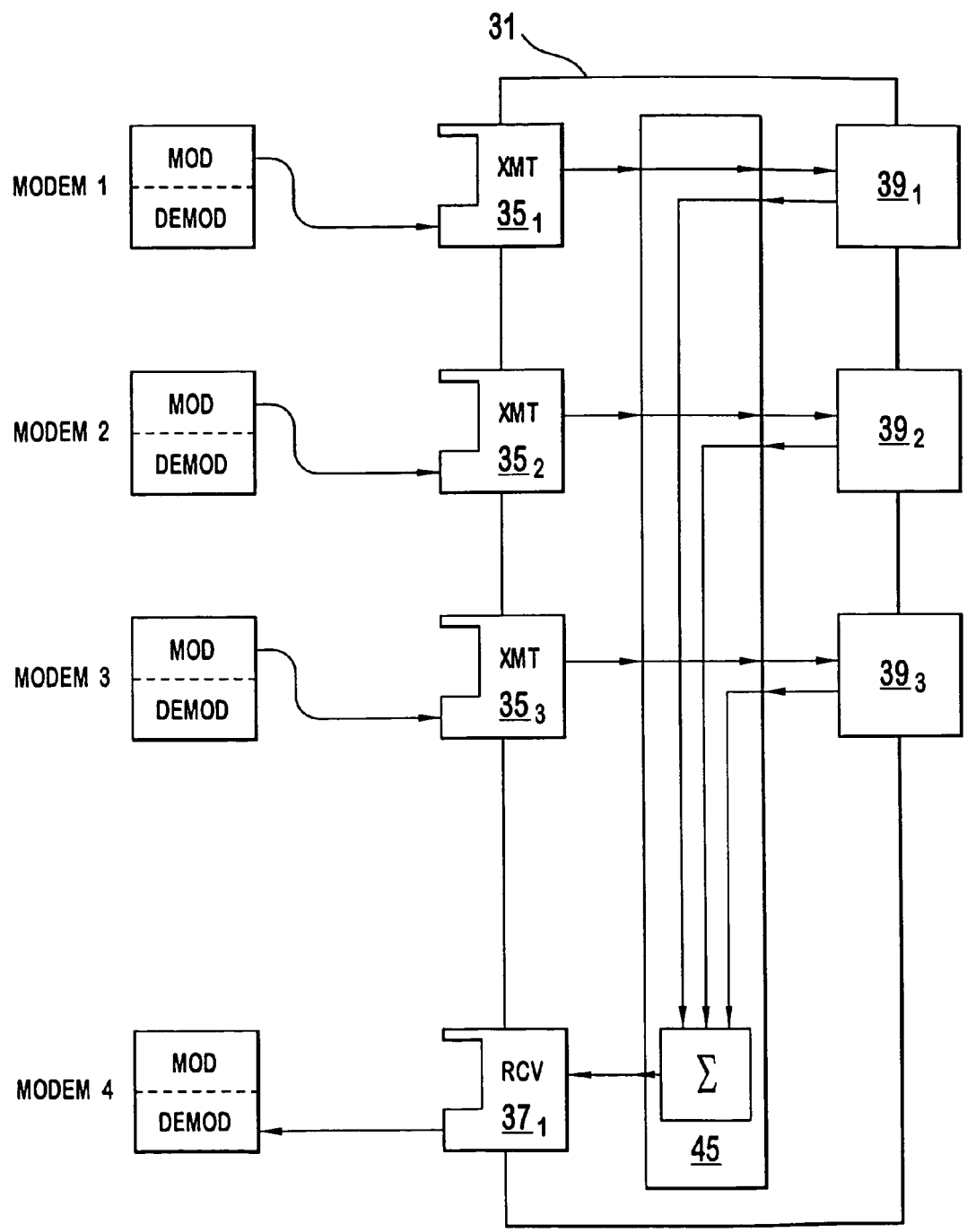
FIG. 4c is a block diagram of a multi-user, multiple access transmission with media impairments simulation using the present invention.
Figure 4D:
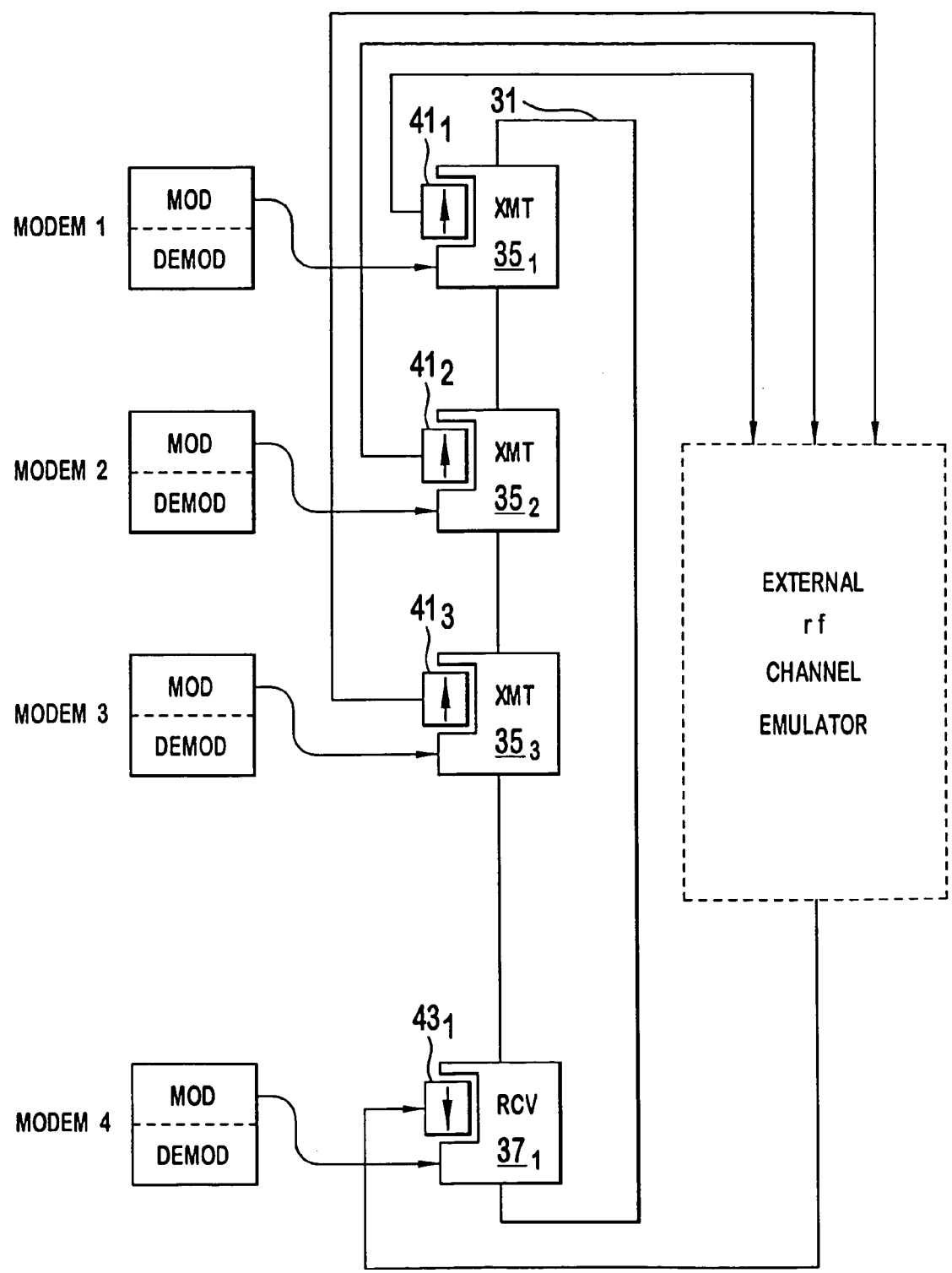
FIG. 4d is a block diagram of a multi-user, multiple access transmission with external radio frequency channel impairments simulation using the present invention.

A user first determines a simulation layout. Example simulations are shown in FIGS. 4a, b, c and d. FIG. 4a shows the emulator 31 coupled to a first modem modulator and to a second modem demodulator simulating a single channel, single access transmission with user selectable impairments in the transmitter and receiver. FIG. 4b shows the emulator 31 coupled to a first modem and a second modem simulating a full duplex, single access transmission with selectable transmitter, receiver and media impairments. FIG. 4c shows a multiple access, multiple user uplink reception simulation between three remote modems communicating with a base station modem with transmitter, receiver and media impairments. FIG. 4d shows a multiple access, multiple user uplink reception simulation between three remote modems communicating with a base station modem using the programmable frequency rf up/downconverters $41_1$, $41_2$, $41_3$, $43_1$ with an external air interface emulator for frequency related multiple access protocols. Other simulation configurations are possible.

The user assembles the emulator 31 with the various module types that are required for a desired simulation and couples the modems under test to the appropriate inputs and outputs on the transmit channel $35_1$, $35_2$, ... $35_n$ and receive channel $37_1$, $37_2$, ... $37_n$ modules. Using either the computer 65 or display 59, the user establishes soft connections with the virtual splitter/combiner 45 between chosen modules completing the simulation configuration.

Using the pointing device, the user opens a dialog box for each module type. Transmit $35_1$, $35_2$, ... $35_n$ and receive $37_1$, $37_2$, ... $37_n$ modules emulate linear and non-linear distortions of mixers, amplifiers, filters, etc. Using the pointing device, the user chooses the radio impairments to be included in the simulation and enters the parameter values for each desired impairment model. Opening a filter dialog box used in an impairment type allows the user to specify characteristics and parameters such as type, slope, 3 dB points, phase offset, group delay, etc. General performance parameters such as sensitivity, I and Q amplitude, signal levels, sampling frequency, rf bandwidth, filter bandwidths, filter response, and output signal scaling, etc., are selected similarly for each module used in the simulation. Media $39_1$, $39_2$, $39_3$, ... $39_n$ channel modules are first configured for the transmission interface type; i.e., unguided or guided, then the configuration parameters for desired impairment models. The same method is used to enter the configuration parameters for each media module as described above. In this manner, the user assembles a digital emulation of transmitters, communication media and receivers, encompassing a complete communication path from transmit modem baseband frequencies to receive modem baseband frequencies.

The application program 67 creates a database which allows the user to store setup parameters and emulation data for later use, and assists in the analysis of each simulation by trending chosen parameters. The program also allows the user to dynamically alter a simulation in progress by adjusting the impairments or removing them from the signal path.

Figure 5B:
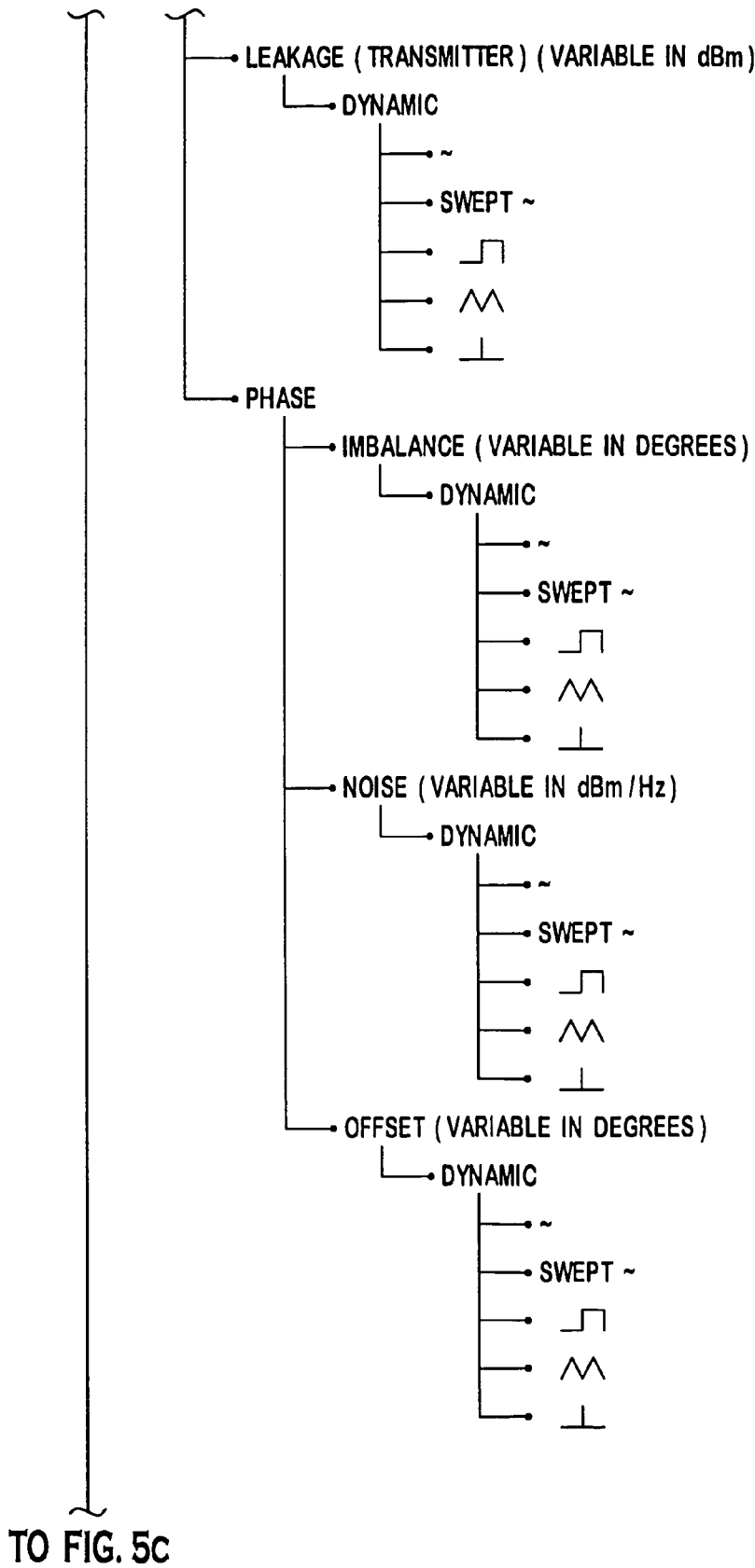
Figure 5C:
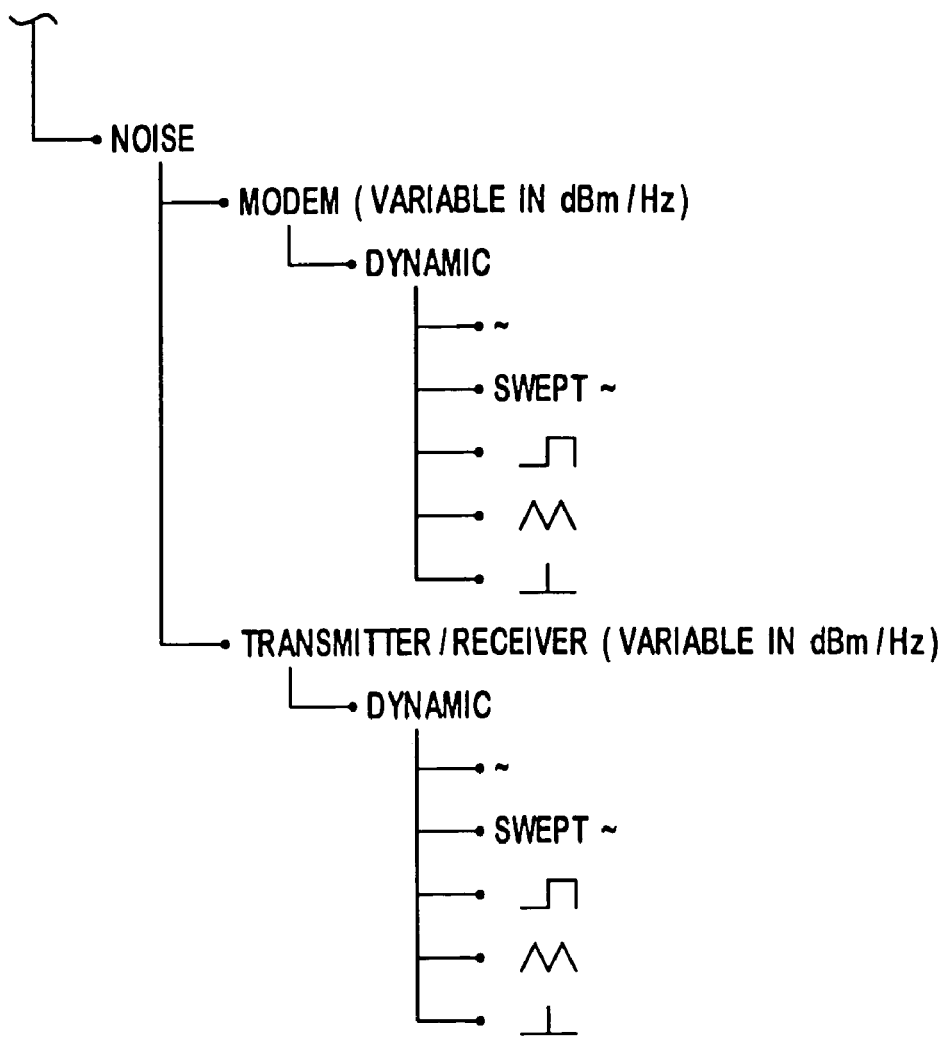
Figure 6:
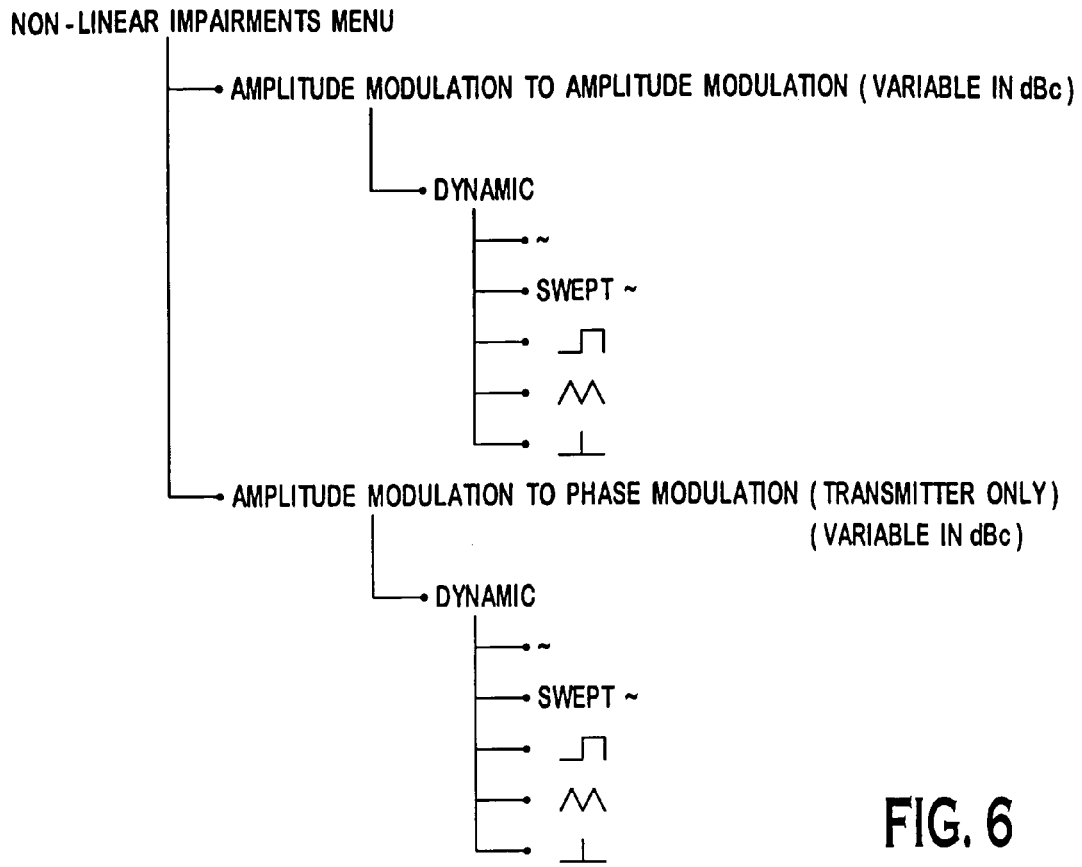
FIG. 6 is a transmit and receive module non-linear impairment emulation menu.
Figure 7:
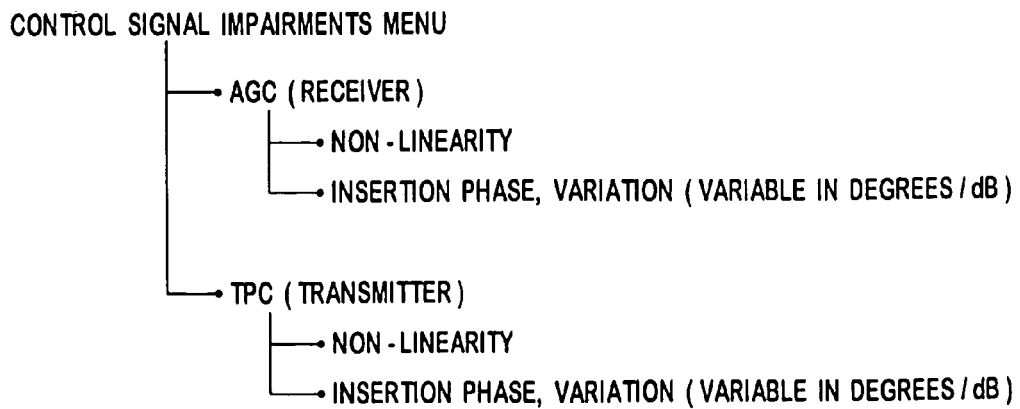
FIG. 7 is a control signal impairment emulation menu.
Figure 8A:
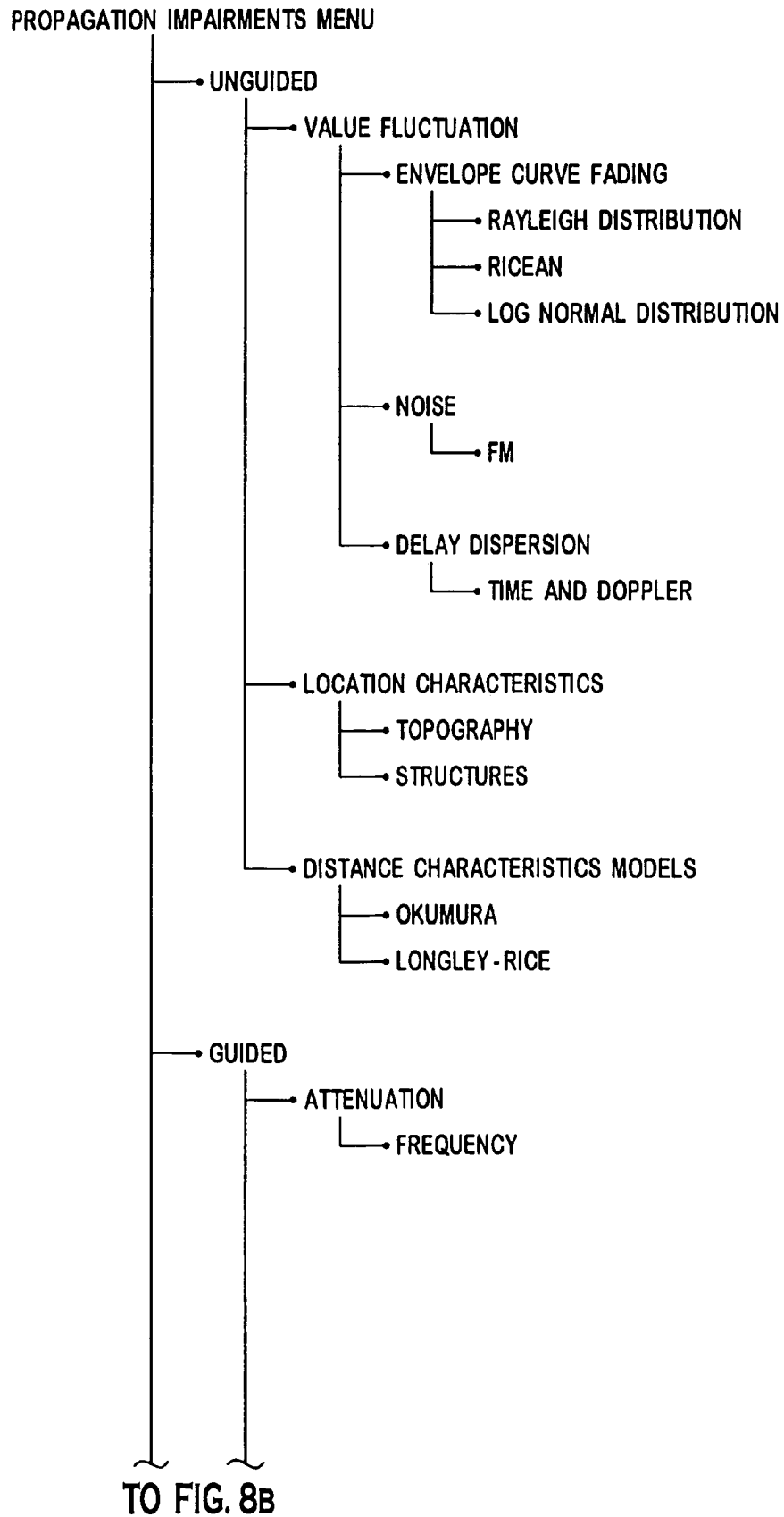
FIGS. 8a and 8b is a media module impairment emulation menu.
Figure 8B:
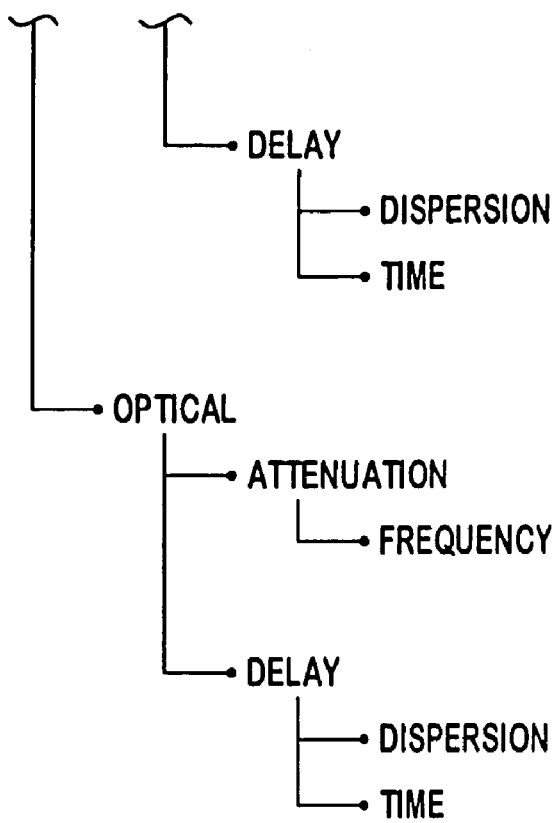

Shown in FIGS. 5a, b and c, 6 and 7 are linear, non-linear and control signal menus of the digital impairment models performed in the transmit 35 and receive 37 channel modules. FIGS. 8a and 8b show a menu of the digital impairment models performed in the communication media modules 39.

With reference to FIGS. 5a, b and c, 6 and 7, the emulator allows for either static or dynamic impairment simulations. Impairment values entered in the impairment model variables remain constant unless changed. If a dynamic test is desired for a particular impairment, the impairment variable itself is varied according to predefined waveforms chosen by the user.

Dynamic tests allow for carrier/data recovery and gain control loop response testing since feedback control loops are embedded in typical DSP modem designs. Control loops include carrier phase recovery loops for I and Q derotation in coherent demodulation designs, symbol timing recovery, pn code tracking loops in direct sequence spread spectrum systems and automatic gain control (AGC) and transmit power control (TPC) loops. Dynamic tests also simulate impairments commonly found in frequency hopping systems and other discontinuous multiple access modulation protocols such as TDMA, Bluetooth®, etc. For example, whenever a frequency hop occurs in a frequency hopping system, the carrier will be at a new frequency and phase, with a new carrier frequency offset after a brief carrier frequency and phase transient interval. These changes occur periodically in a frequency hopping system and can be simulated with periodic waveforms modulating the impairments, (for example, by modulating the carrier frequency offset impairment variable).

Once a communication system is simulated and put through the aforementioned dynamic tests, the response can be observed. For example, a parameter value or metric located in a digital signal processor used in a test modem can be observed, or have its history logged and filed for later retrieval and examination. Observation can also be performed through external test equipment such as storage oscilloscopes and logic analyzers, coupled to the emulator inputs and outputs when performing a simulation which may be used in conjunction with the emulator 31. Parameters such as instantaneous phase error or phase variance, inside of the system's tracking loop, can be measured to evaluate the behavior of a pn-code tracking loop or on an rf carrier derotation control loop in response to the chosen stimulus.

To dynamically verify performance of the various control loops and to check overall modem response, the emulator applies stimuli in the form of impairment variables modulated as sine waveforms, swept sine waveforms, square waveforms for step response testing, sawtooth waveforms for ramp response testing, impulse responses and other composite waveforms known to those skilled in this art. The plurality of waveforms are generated by a processor onboard each transmit and receive module programmed via software and are themselves totally configurable. The dynamic impairments can be chosen for applicable impairment types from the menus shown on FIGS. 5a, b and c, 6, and 7a and 7b. The dynamic simulation measurements are analyzed to verify that the individual modem control loops achieve their designed performance and to provide further control loop optimization.

Transmit and Receive Module Linear Impairment Models

Amplitude Imbalance

Figure 9:
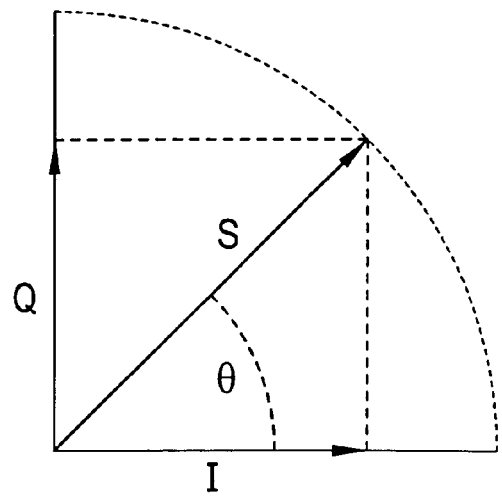
FIG. 9 is an exemplary plot of I and Q signal vectors.

To accurately simulate amplitude imbalance without introducing other adverse affects to the signals, total signal power is altered from a constant value. Shown in FIG. 9 is a plot of the ideal spacial relationship between I and Q signal vectors in a two dimensional signal space and their resultant power vector S. The sum of vectors I and Q yields vector S. Let |S| equal the radius of a unit circle (1), then $$I = S \cos\theta, \text{ and}$$

$$Q = S \sin\theta.$$

Therefore, $$S = \sqrt{(I^2 + Q^2)}, \text{ or}$$

$$S^2 = I^2 + Q^2 \tag{3}$$

yielding, $$P_{ave} = \frac{1}{T}\int_0^T S^2 \, dt \tag{4}$$

Figure 10:
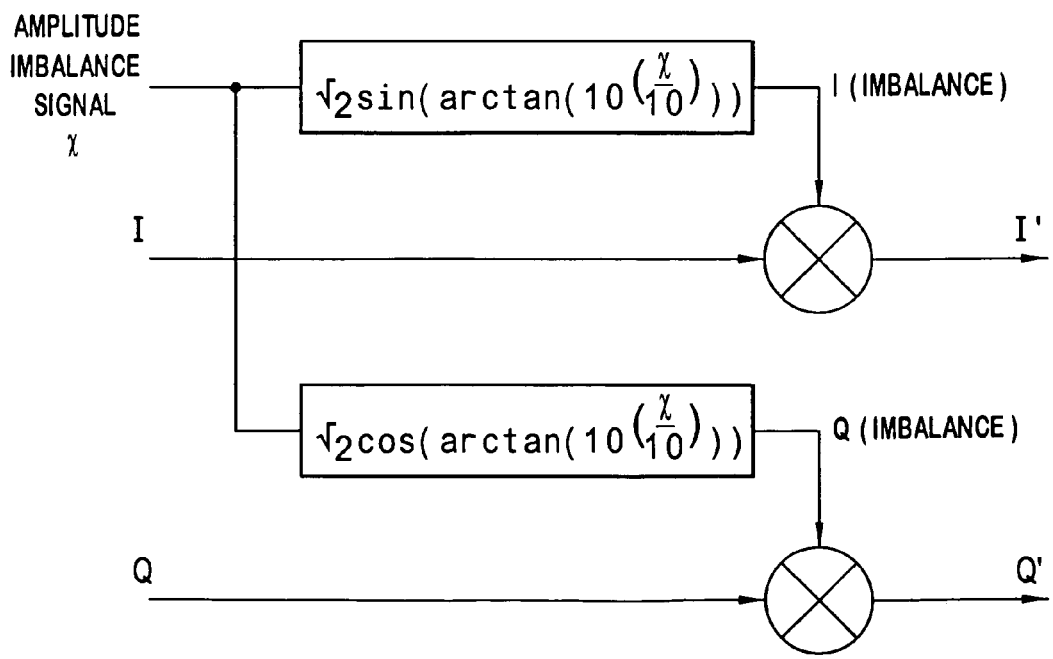
FIG. 10 is a system diagram of an amplitude imbalance impairment model.

Amplitude imbalance is modeled by generating a disparity between the respective I and Q signal gains. The emulator models amplitude imbalance as shown in FIG. 10. Since total instantaneous power is $$P_t = |I|^2 + |Q|^2,$$

and in order to keep the total power constant after an imbalance is applied, the I and Q imbalances are defined as $$I(\text{imbalance}) = (\sqrt{2})\sin(arc\, \tan(10^{(x/10)})), \text{ and} \tag{5}$$

$$Q(\text{imbalance}) = (\sqrt{2})\cos(arc\, \tan(10^{(x/10)})), \tag{6}$$

where ±controls the imbalance. For x=0, the amplitude imbalance between the I and Q signals is zero (x is entered as dB).

Carrier Phase Imbalance

Figure 11:
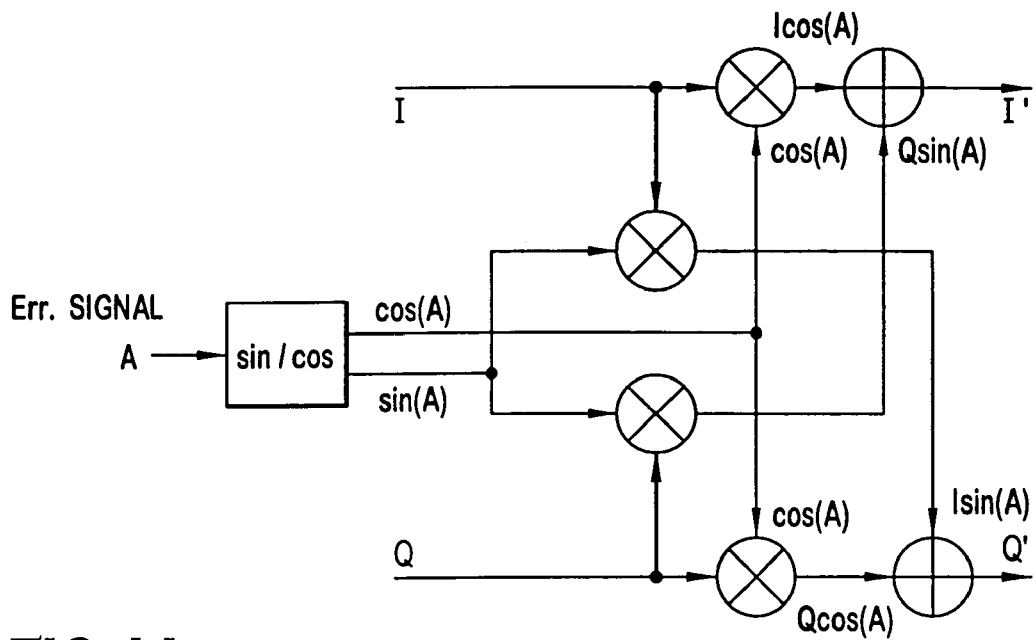
FIG. 11a is a system diagram of a carrier phase offset impairment model.
FIG. 11b is a plot showing resultant phase impairment.
Figure 11:
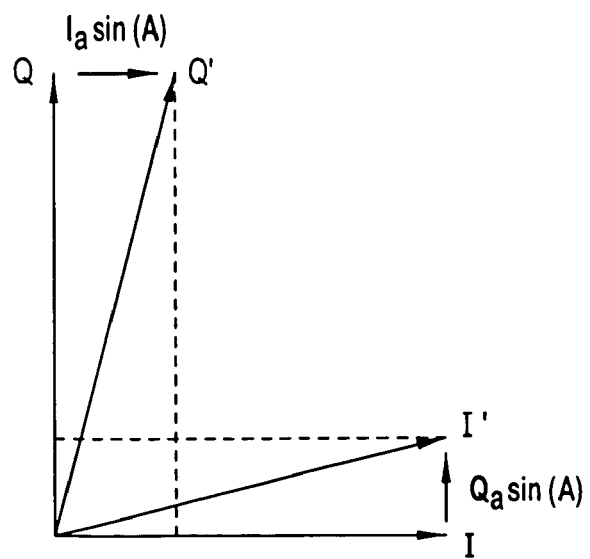

Carrier phase imbalance is modeled by inserting a phase difference other than 90° between the I and Q signal components. The emulator implements phase imbalance as shown in FIG. 11a. Let $$I = I_a \sin(\omega t), \text{ and}$$

$$Q = Q_a \cos(\omega t), \text{ where}$$

|I| and |Q|=1.

I and Q represent examples of signals that are applied to the input of the phase imbalance model with A equal to the phase error term, $$\begin{aligned} I' &= I\cos(A) + Q\sin(A) \\ &= I_a \sin(\omega t)\cos(A) + Q_a \cos(\omega t)\sin(A) \\ &= \sin(\omega t + A); \text{ and} \end{aligned} \tag{7}$$

$$\begin{aligned} Q' &= Q\cos(A) + I\sin(A) \\ &= Q_a \cos(\omega t)\cos(A) + I_a \sin(\omega t)\sin(A) \\ &= \cos(\omega t - A). \end{aligned} \tag{8}$$

FIG. 11b shows the effect of the phase imbalance error term A on the I and Q vectors.

Carrier Frequency Offset and Carrier Phase Offset

Figure 12:
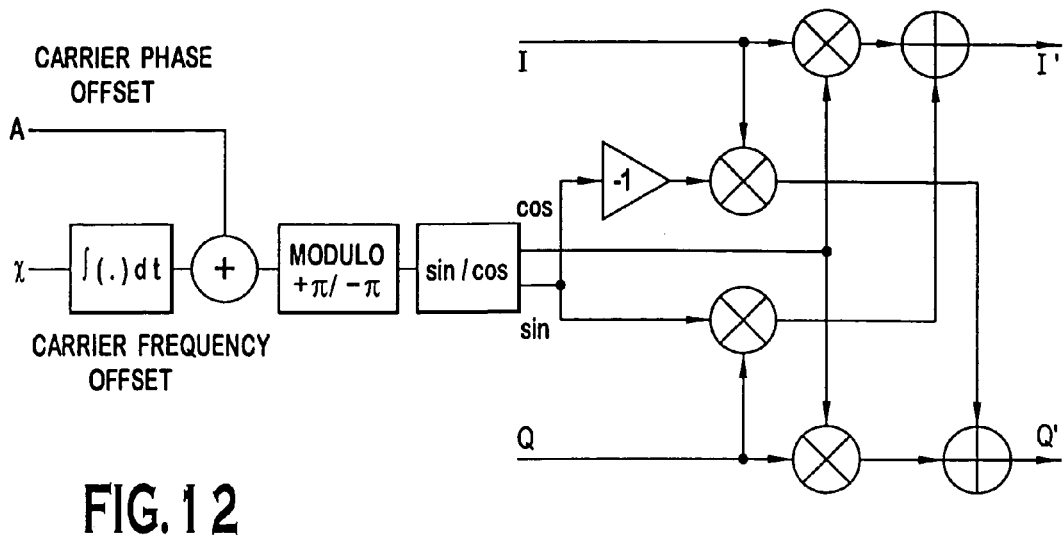
FIG. 12 is a system diagram of a carrier phase and frequency offset impairment model.

Frequency offset is modeled by altering the frequency of the carrier signal by constantly rotating the I and Q signals with a frequency offset signal X. The emulator implements frequency offset as shown in FIG. 12.

$$I = I_a \sin(\omega t), \text{ and}$$

$$Q = Q_a \cos(\omega t),$$

$$\begin{aligned} I' &= I\cos(A) + Q\sin(A) \\ &= I_a \sin(\omega t)\cos(A) + Q_a \cos(\omega t)\sin(A) \\ &= \sin(\omega t + A) \\ &= \sin((\omega + X)t), \text{ and} \end{aligned} \tag{9}$$

$$\begin{aligned} Q' &= Q\cos(A) - I\sin(A) \\ &= Q_a \cos(\omega t)\cos(A) - I_a \sin(\omega t)\sin(A) \\ &= \cos(\omega t + A) \\ &= \cos((\omega + X)t). \end{aligned} \tag{10}$$

The phase offset component is A and the frequency offset component is and |I| and |Q|=1.

Carrier Phase Noise

Figure 13:
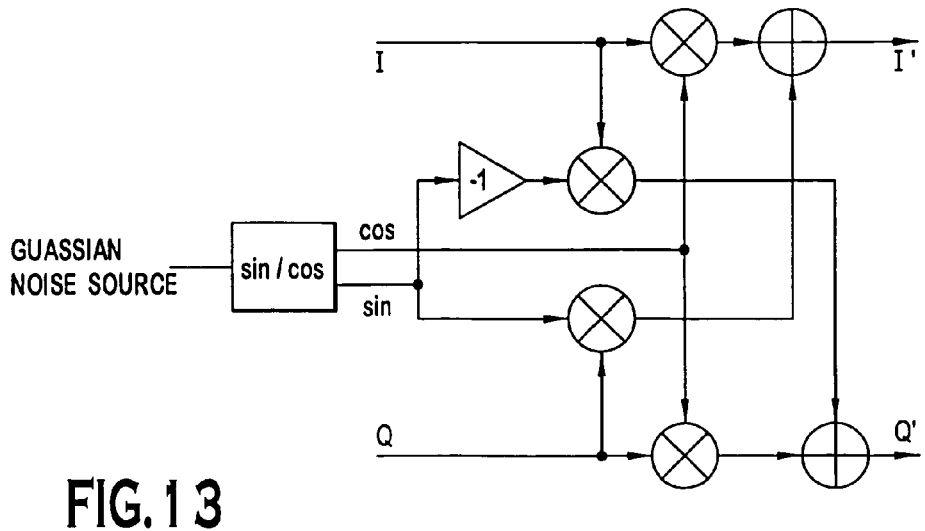
FIG. 13 is a system diagram of a phase noise impairment model.

Carrier phase noise is modeled by introducing a random noise component to each signal. The emulator implements phase noise as shown in FIG. 13. A pseudo noise (pn) generator having a Gaussian distribution adds noise similar to that generated in semiconductors.

pn signal=A=x(t) with |I| and |Q|=1 where x(t) is a random variable with a Gaussian distribution, and $$I = I_a \sin(\omega t), \text{ and}$$

$$Q = Q_a \cos(\omega t),$$

$$\begin{aligned} I' &= I\cos(A) + Q\sin(A) \\ &= I_a \sin(\omega t)\cos(A) + Q_a \cos(\omega t)\sin(A) \\ &= \sin(\omega t + A), \text{ and} \end{aligned} \tag{11}$$

$$\begin{aligned} Q' &= Q\cos(A) - I\sin(A) \\ &= Q_a \cos(\omega t)\cos(A) - I_a \sin(\omega t)\sin(A) \\ &= \cos(\omega t + A). \end{aligned} \tag{12}$$

The I and Q signals will be constantly phase modulated by the pn signal A.

Transmit/Receive Noise

Figure 14:
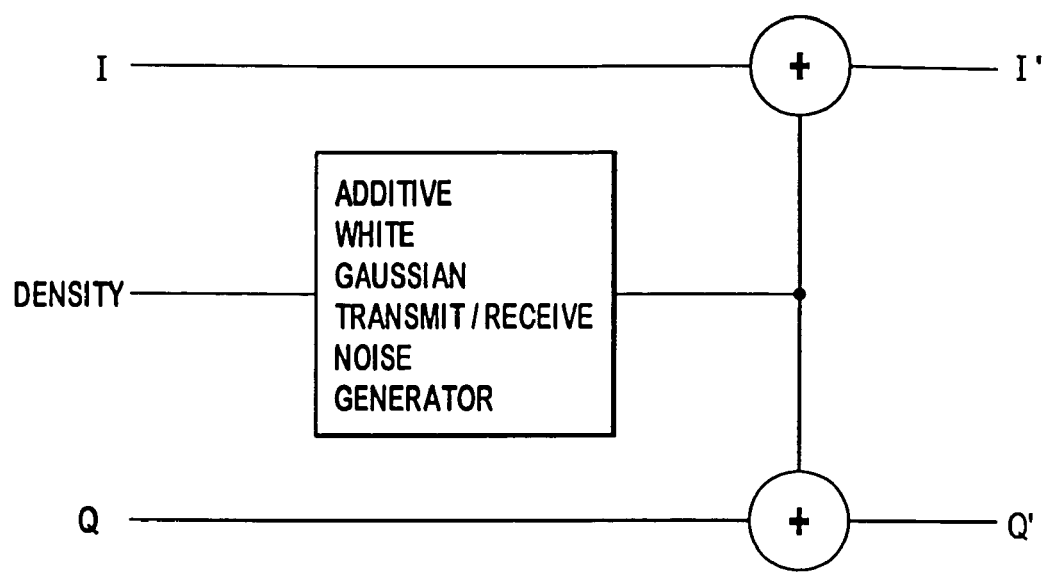
FIG. 14 is a system diagram of a transmit/receive noise impairment model.

Transmit (or receive) noise is modeled by introducing a random noise component to the noise floor of each I and Q signal. The emulator implements transmit/receive noise as shown in FIG. 14. An additive white Gaussian noise source adds a miscellaneous noise component.

Modem Noise

Figure 15:
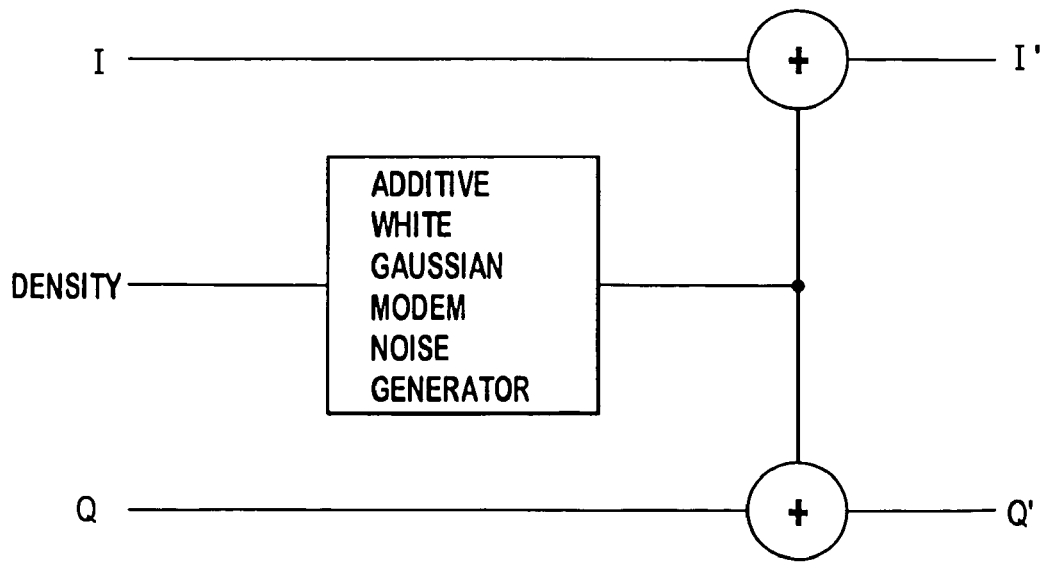
FIG. 15 is a system diagram for a modem noise impairment model.

Modem noise is modeled by introducing a random noise component to each I and Q signal. The emulator implements transmit/receive noise as shown in FIG. 15. An additive white Gaussian noise source adds a miscellaneous noise component.

Bandwidth Group Delay

Figure 16:
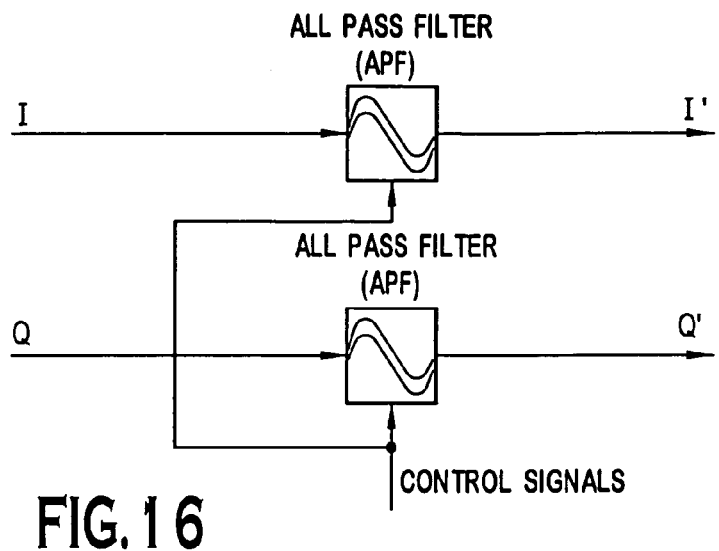
FIG. 16 is a system diagram of a group delay impairment model using all pass filters.

Bandwidth group delay variation is modeled with pass band filters having a flat response but with variable phase. The emulator implements group delay as shown in FIG. 16.

Bandwidth Limitations

Figure 17:
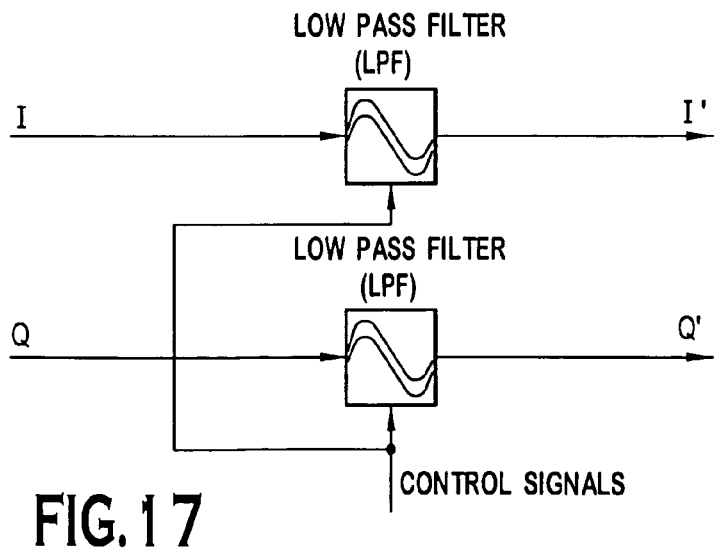
FIG. 17 is a system diagram of a bandwidth limitation impairment model using low pass filters.

Bandwidth limitations are modeled using a finite impulse response (FIR) filter, infinite impulse response (IIR) or combination filter to create variable cut-off frequencies and manipulate frequency response. The emulator implements bandwidth limitations as shown in FIG. 17.

Carrier Leakage

Figure 18:
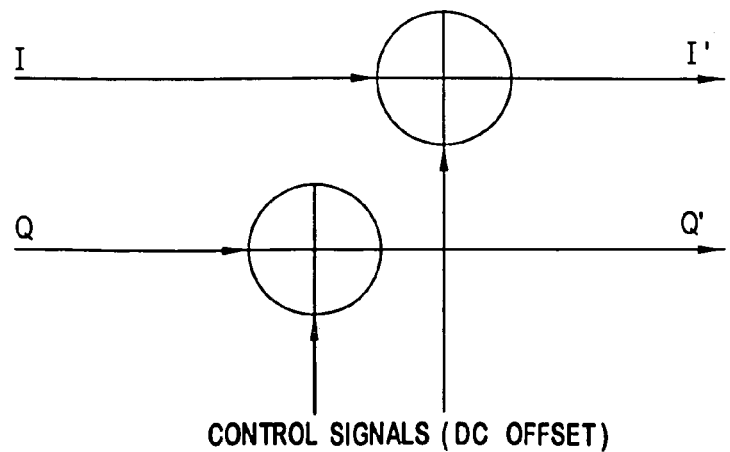
FIG. 18 is a system diagram of a dc carrier offset impairment model.

Carrier leakage is modeled by adding a Vdc offset component to the I and Q signals. The emulator implements carrier imbalance as shown in FIG. 18.

Control Signal

Figure 19:
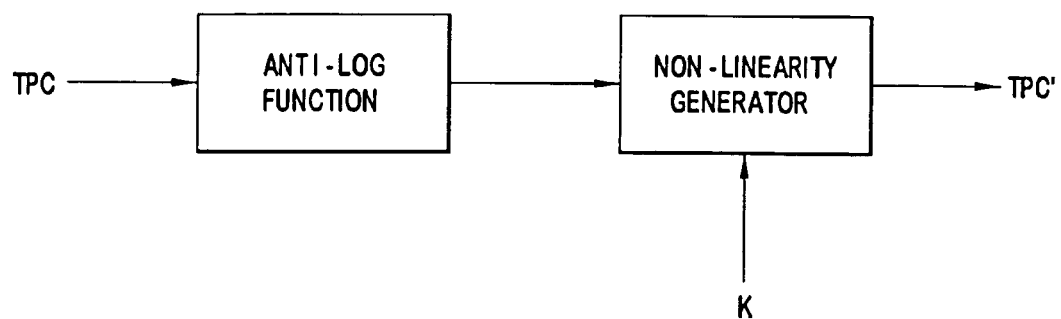
FIG. 19 is a system diagram of a TPC impairment model.
Figure 20:
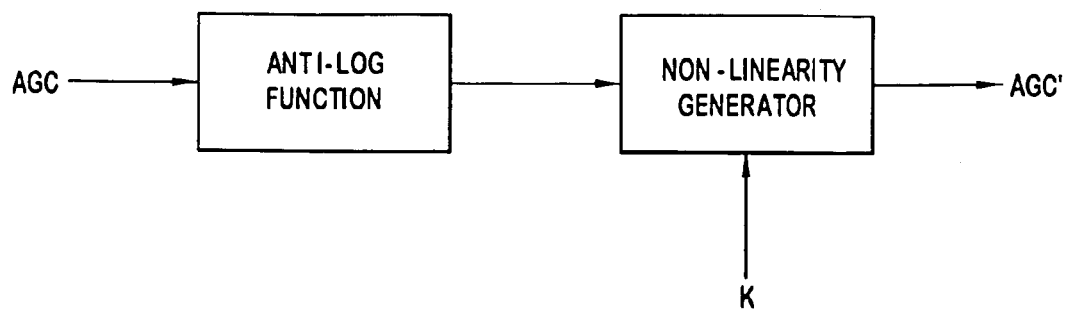
FIG. 20 is a system diagram of an AGC impairment model.

Control signal impairments are modeled by first converting a log-gain control signal to a linear-gain signal and secondly, processing through a non-linearity function shown in FIGS. 19 and 20.

Transmit and Receive Module Non-Linear Impairment Models

Amplitude Modulation (AM) to Amplitude Modulation (AM)

Figure 21:
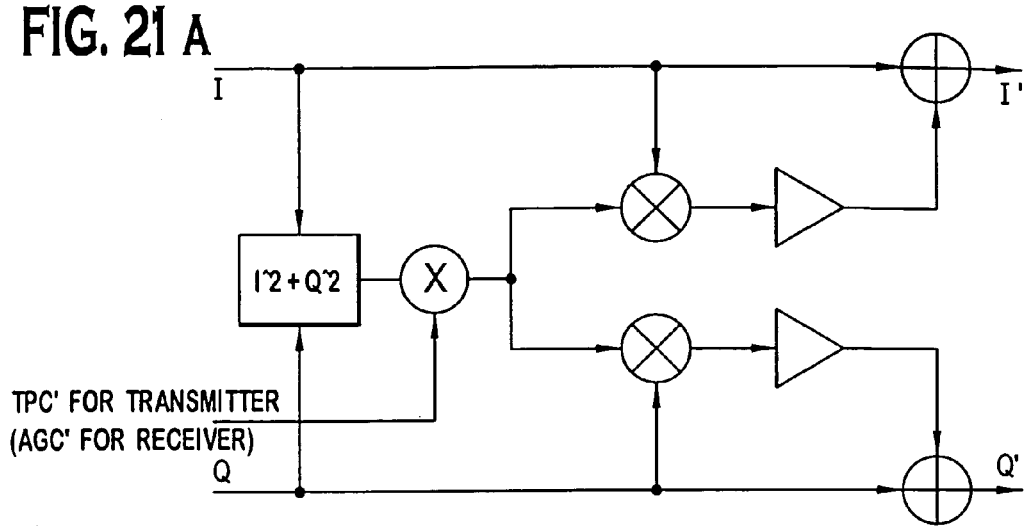
FIG. 21a is a system diagram of an AM to AM distortion impairment model.
FIG. 21b is a plot showing AM to AM distortion components.
FIG. 21c is a plot showing amplifier output compression.
Figure 21:
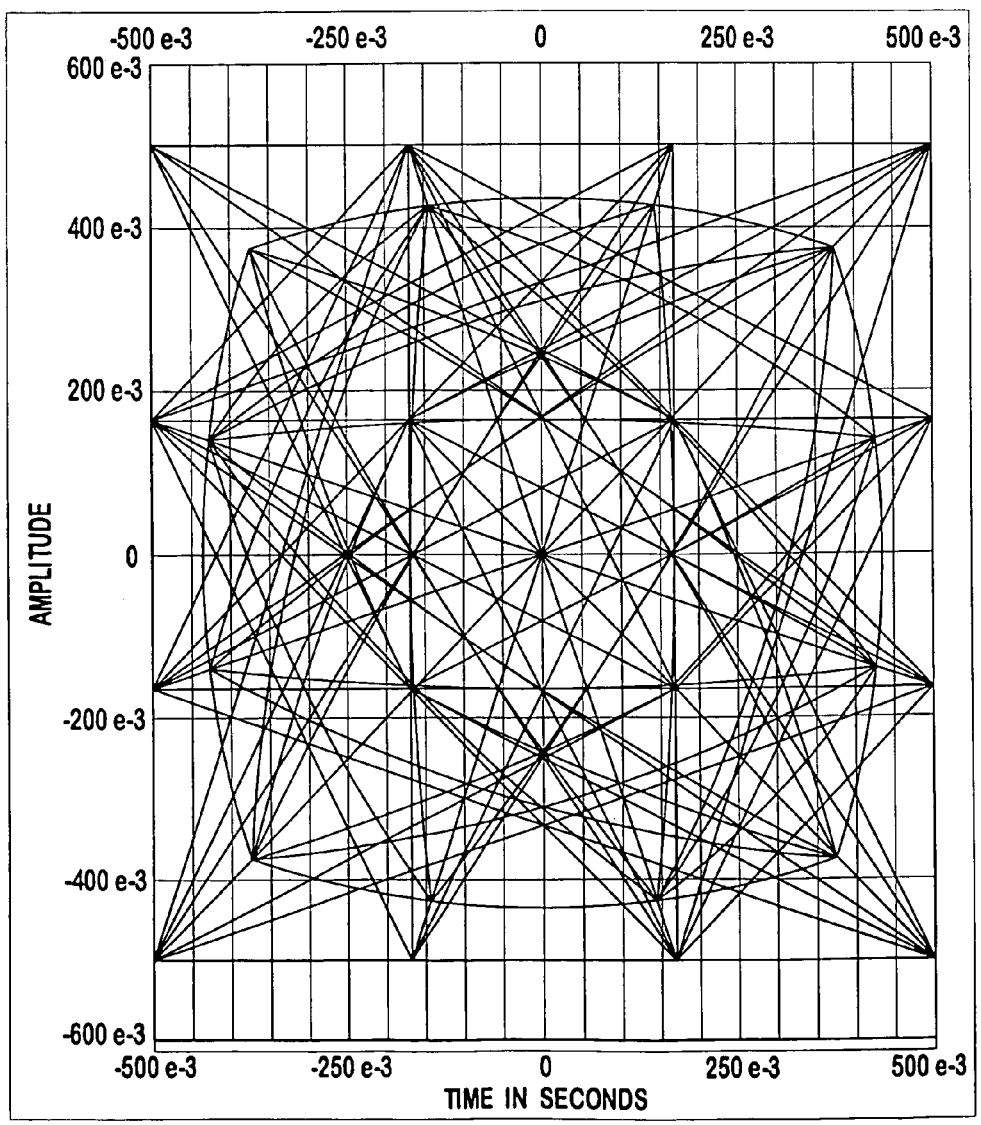
Figure 21:
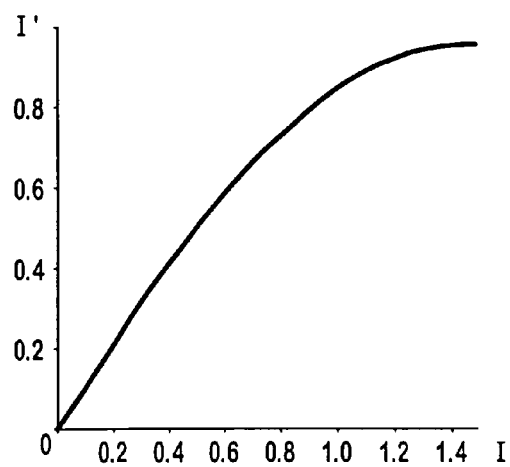

AM to AM distortion is modeled using a programmable coefficient of non-linearity. The emulator implements AM to AM distortion as shown in FIG. 21*a*. The resultant signal constellation is shown in FIG. 21*b*. The outer perimeter of the box represents an uncompressed I/Q vector moving through different phase angles with constant amplitude. When impairment variable k is changed to a value compressing the signal, the vector length is shortened. This action creates the smaller 'television screen' shaped box within. As the magnitude of the vector changes, the phase remains constant. This impairment is implemented using Equation 15 as shown in FIG. 20*a*, or, in an alternative embodiment, as a look-up-table (LUT). The LUT implements the Equation, or, contains a predetermined set of values to allow modeling of any arbitrary AM—AM distortion.

$$I'=I(1-k(I^2+Q^2)), \text{ and} \quad (13)$$

$$Q'=Q(1-k(I^2+Q^2)), \quad (14)$$

where $I=A \sin(\omega t)$ $Q=A \cos(\omega t)$, where $A$ is a constant.

Since $I^2$ is approximately equal to $Q^2$, Equations 13 and 14 reduce to the following form:

$$I'=I-2kI^3. \quad (15)$$

A plot of this equation is shown in FIG. 21*c* for k=1/12, I=0–1.5. This is a typical amplifier compression curve.

Amplitude Modulation (AM) to Phase Modulation (PM)

Figure 22A:
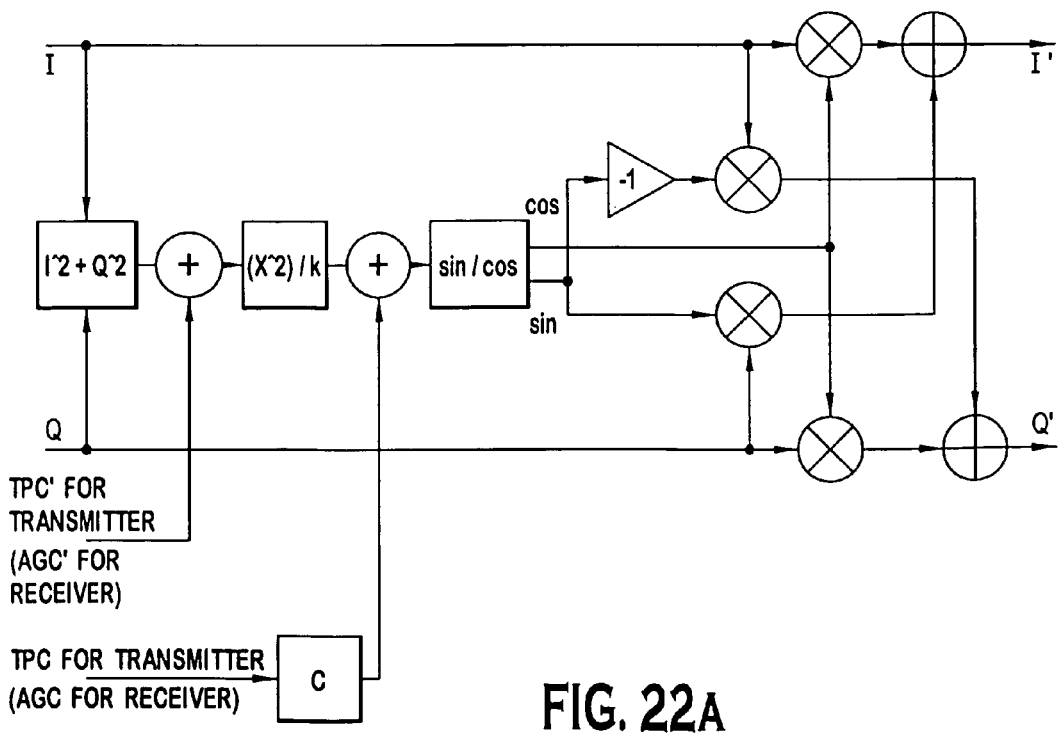
FIG. 22a is a system diagram of an AM to PM distortion impairment model.
Figure 22B:
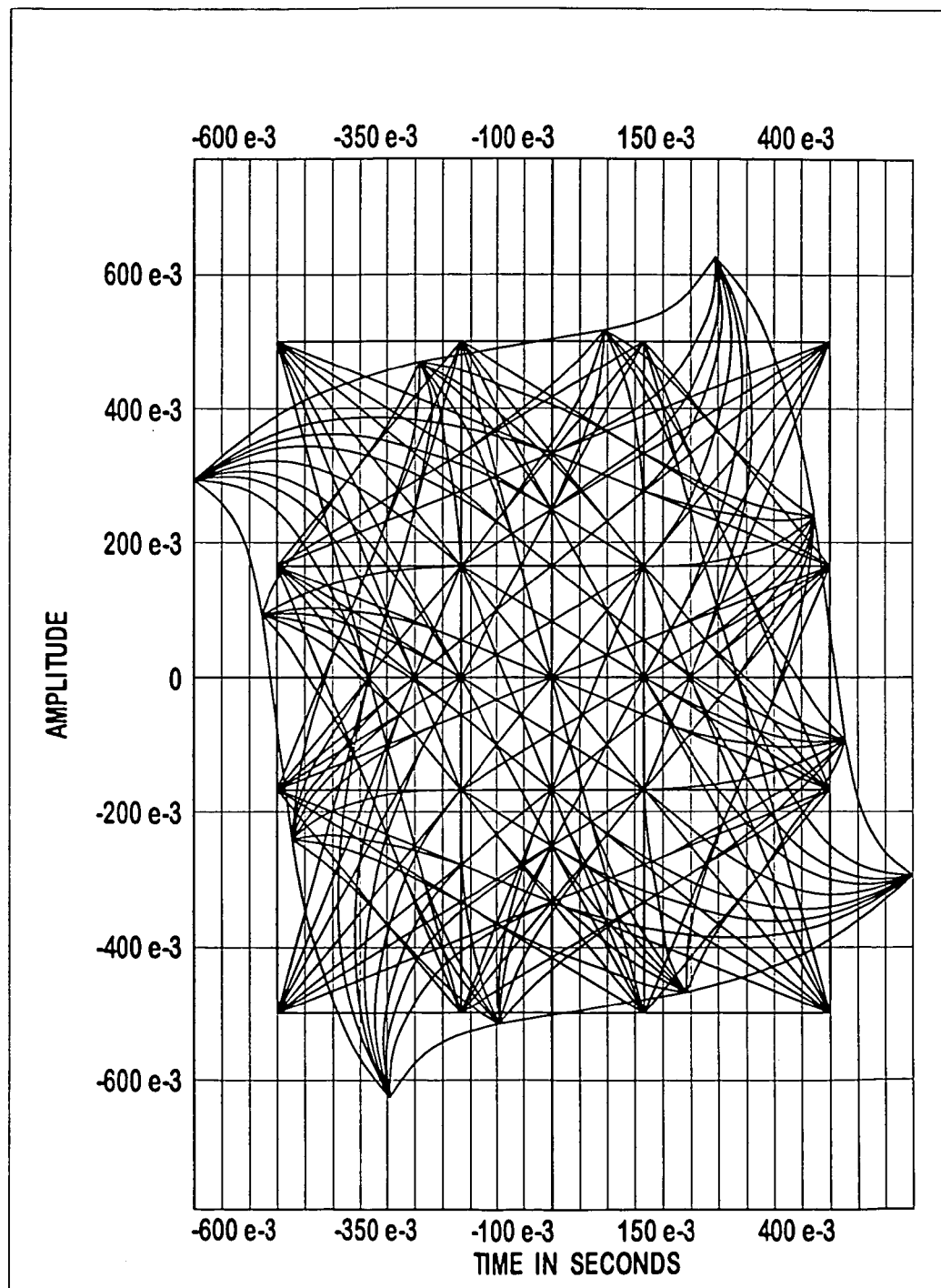
FIG. 22b is a plot showing AM to PM distortion components.
Figure 23A:
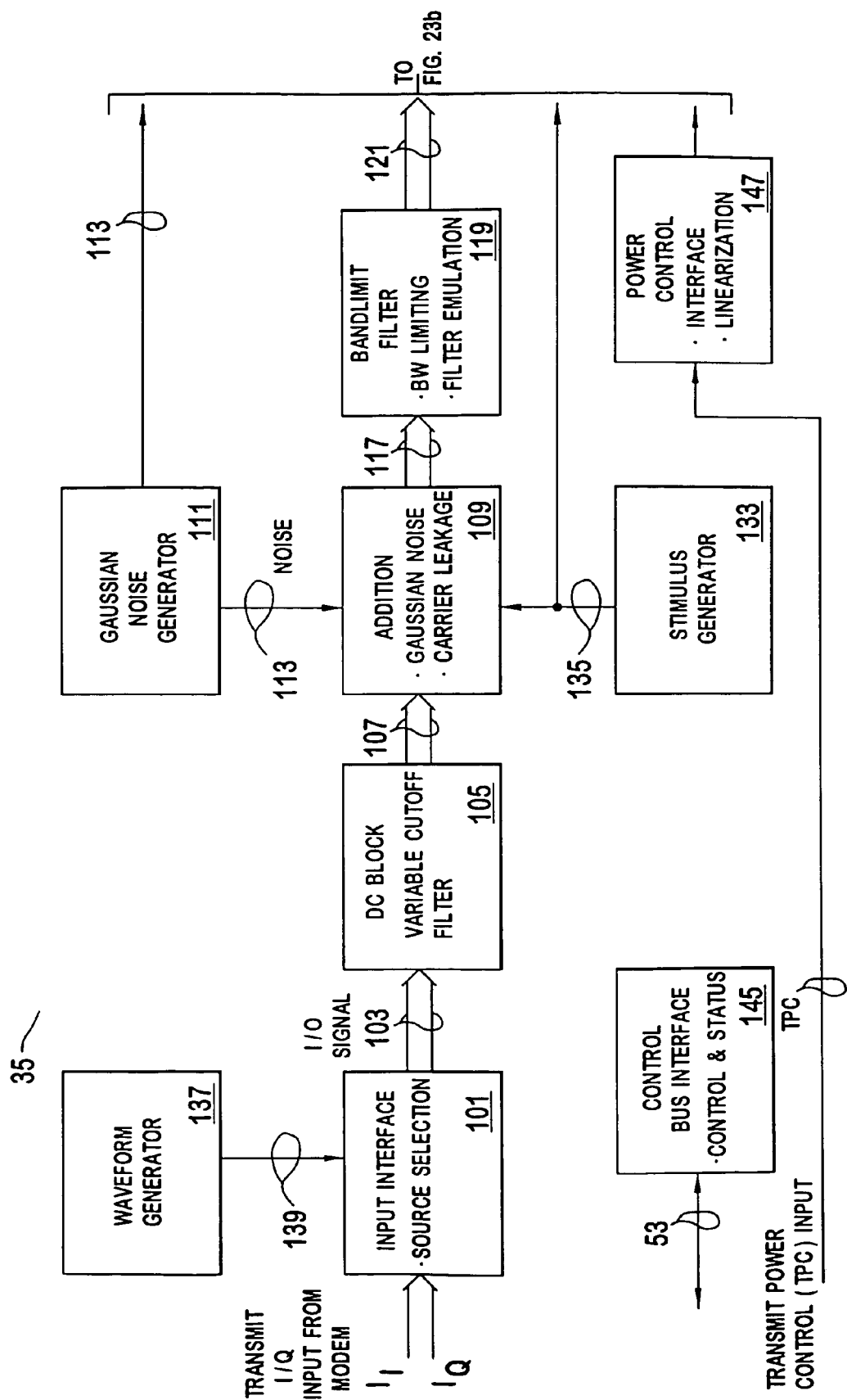
FIGS. 23a and 23b is a detailed system block diagram of a transmit module of the present invention.
Figure 23B:
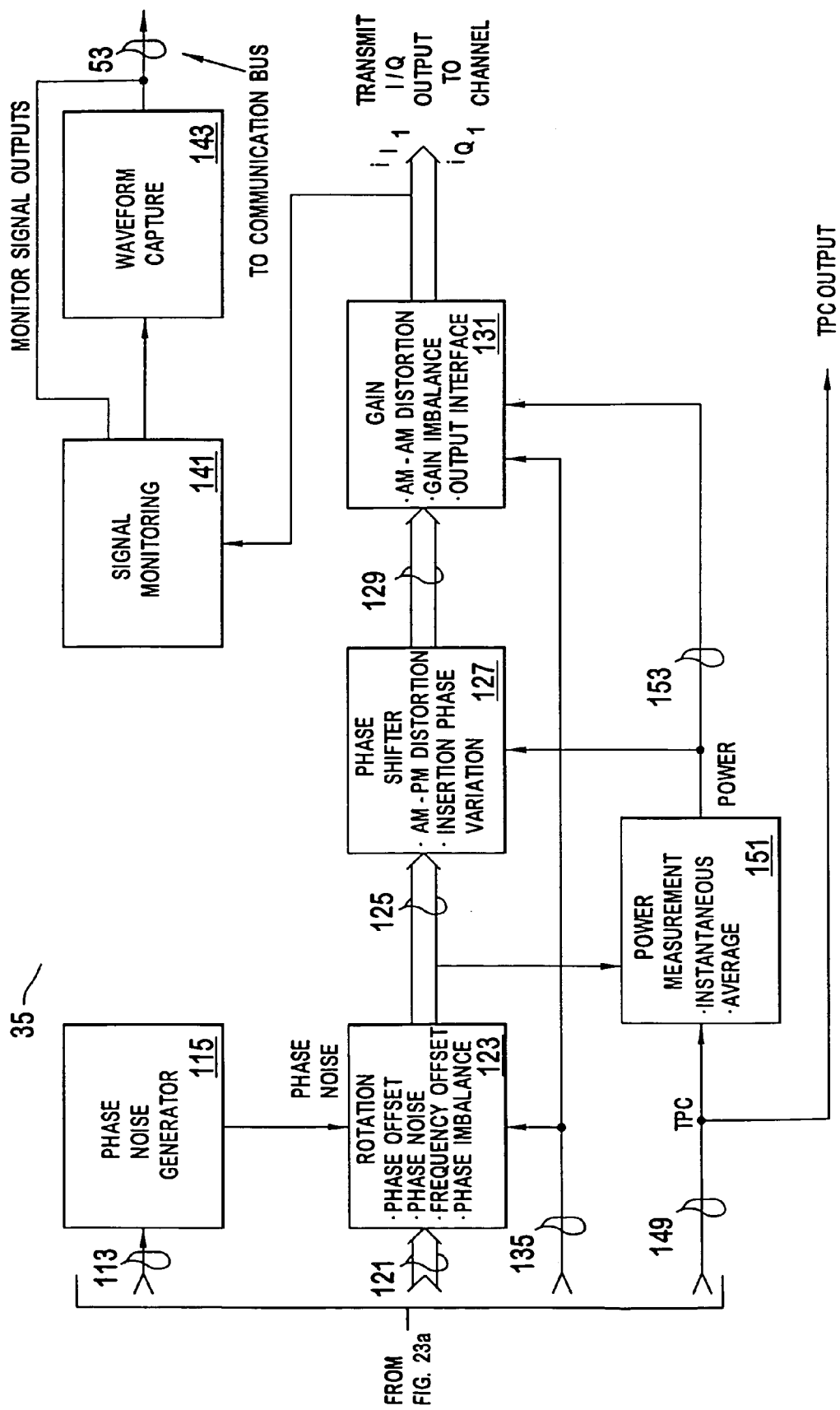

AM to PM distortion is modeled using a programmable coefficient of non-linearity. The emulator models AM to PM distortion as shown in FIG. 22*a* where k is the programmable coefficient of non-linearity. The constellation shown in FIG. 22*b* represents a signal vector with no impairment rotating through different phases. As the input signal level increases, the vector will increase in magnitude and start to rotate in a counter-clockwise direction, indicating an increase in phase. If the AM—AM impairment is off, there will be no change in length. This impairment is implemented using Equations 17 and 18 as shown in FIG. 22*a*, or, in an alternative embodiment, as a LUT. The LUT implements the Equations, or, contains a predetermined set of values to allow modeling of any arbitrary AM-PM distortion.

$A=(I^2+Q^2)^2/k,$ $I=1 \sin(\omega t),$ and $$Q=1 \cos(\omega t) \quad (16)$$

then, $$\begin{aligned} I' &= I\cos(A) + Q\sin(A) \\ &= \sin(\omega t)\cos(A) + \cos(\omega t)\sin(A) \\ &= \sin(\omega t + A), \text{ and} \end{aligned} \quad (17)$$

$$\begin{aligned} Q' &= q\cos(A) - Q\sin(A) \\ &= \cos(\omega t)\cos(A) - \sin(\omega t)\sin(A) \\ &= \cos(\omega t + A). \end{aligned} \quad (18)$$

The impairment variable in FIG. 22*a* controls the amount of insertion phase variation affecting the signal. The phase is offset by an amount proportional to the TPC signal level.

Shown in FIGS. 23*a* and 23*b*, and 24*a* and 24*b* is the execution of the above impairment models by the present invention 31 transmit channel 35 and receive channel 37 modules respectively. Referencing FIGS. 23*a* and 23*b*, data signal outputs and a total power control (TPC) output from a transmit modem (not shown) assembled in a simulation are coupled to the signal $I_I$, $I_Q$ and TPC inputs of a transmit module 35. The inputs $I_I$, $I_Q$ are coupled to a signal conditioner 101 for level adjustment or digitization if the input signal $I_I$, $I_Q$ is in continuous time. The signal 103 is output to a filter 105 which performs a high pass filter action blocking low frequency signal components. The filtered signal 107 is coupled to an addition processor 109 where the Gaussian noise addition (as modem noise) and carrier leakage impairments are performed. Gaussian noise is generated by an onboard generator 111 having an output 113 coupled to the addition processor 109 and to a phase noise generator 115. After addition impairments are performed, the output 117 is coupled to a filter 119 which performs the bandwidth limitation impairment.

The output 121 of the filter 119 is coupled to a rotation processor 123 which performs I and Q rotation on symbol components. The rotation processor 123 applies a fixed angular rotation between the I and Q components to effect phase imbalance; a continuous rotation to effect frequency offset; a static rotation to effect phase offset; and a random ± change in phase angle to effect phase noise. The rotation processor 123 output 125 is coupled to a phase shifter 127 which applies the non-linear AM to PM and insertion phase variation impairments and is output 129 to a final gain processor 131 which performs the gain imbalance, AM to AM impairment and output signal conditioning. A power measurement processor 151 calculates the instantaneous signal power ($I^2+Q^2$) 153 for use by the gain processor 131 to perform the AM—AM and AM-PM impairments. The power measurement processor 151 also calculates the long term average power (of $I^2+Q^2$) for display 59, 69.

A stimulus generator 133 for producing the plurality of wave shapes 135 for dynamic evaluation is coupled to the addition processor 109, rotation processor 123 and gain processor 131. Additionally, a waveform generator 137 generates signals 139 for calibration and module self diagnostics and demonstration purposes. Depending upon the simulation in progress, the impaired digital output $i_{I1}$, $i_{Q1}$, is coupled to an rf up-converter 41 for external channel emulation, or coupled to a media 39 or receive 37 module via the virtual splitter/combiner 45. Performance measurements are captured by a signal monitor 141 and waveform capture 143 for outputting onto the communication bus 53. A bus control interface 145 bidirectionally communicates with the central microprocessor 47 via the communication bus 53 downloading impairment variables and uploading performance measurements for display or storage.

Figure 24A:
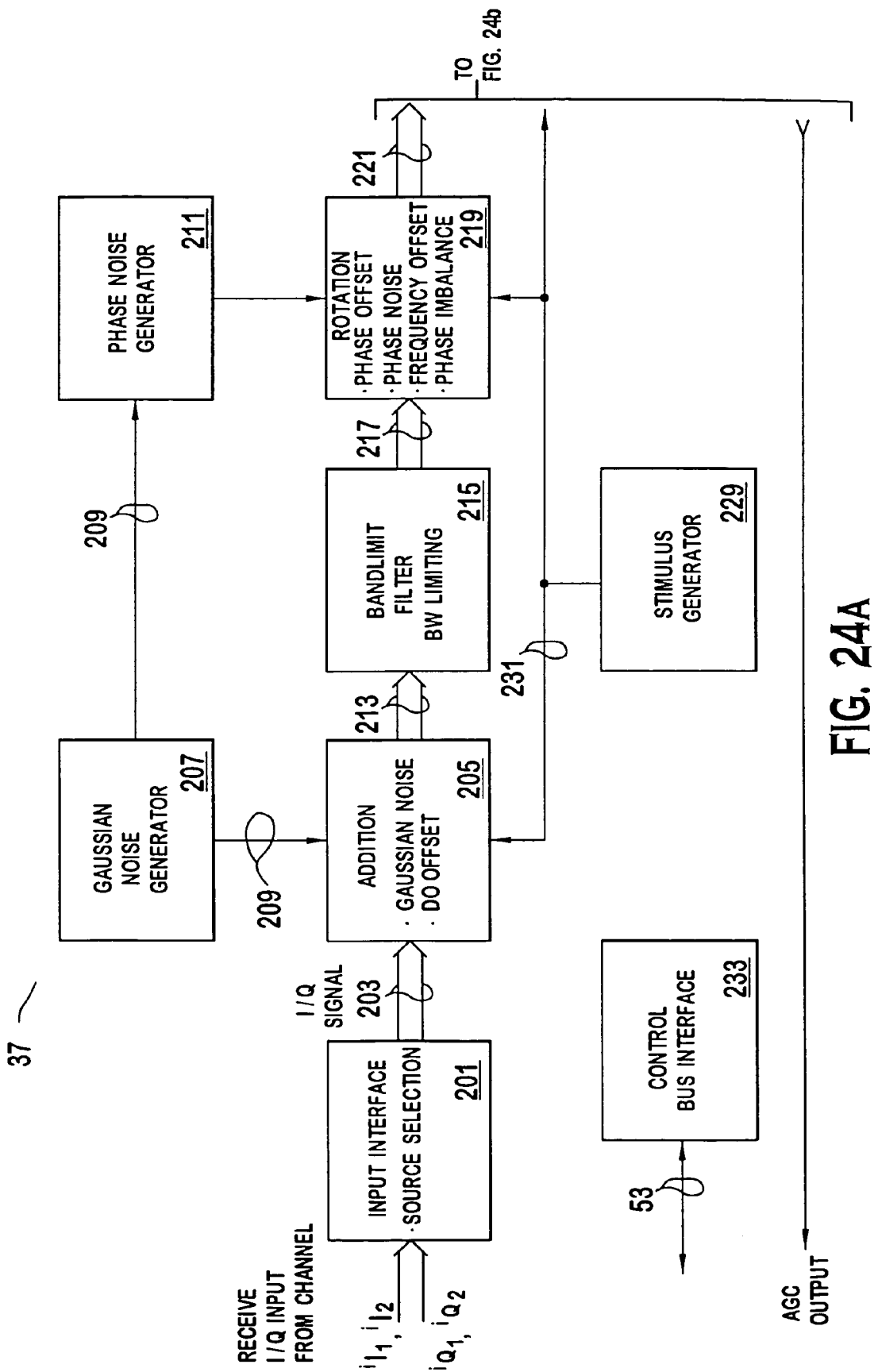
FIGS. 24a and 24b is a detailed system block diagram of a receive module of the present invention.
Figure 24B:
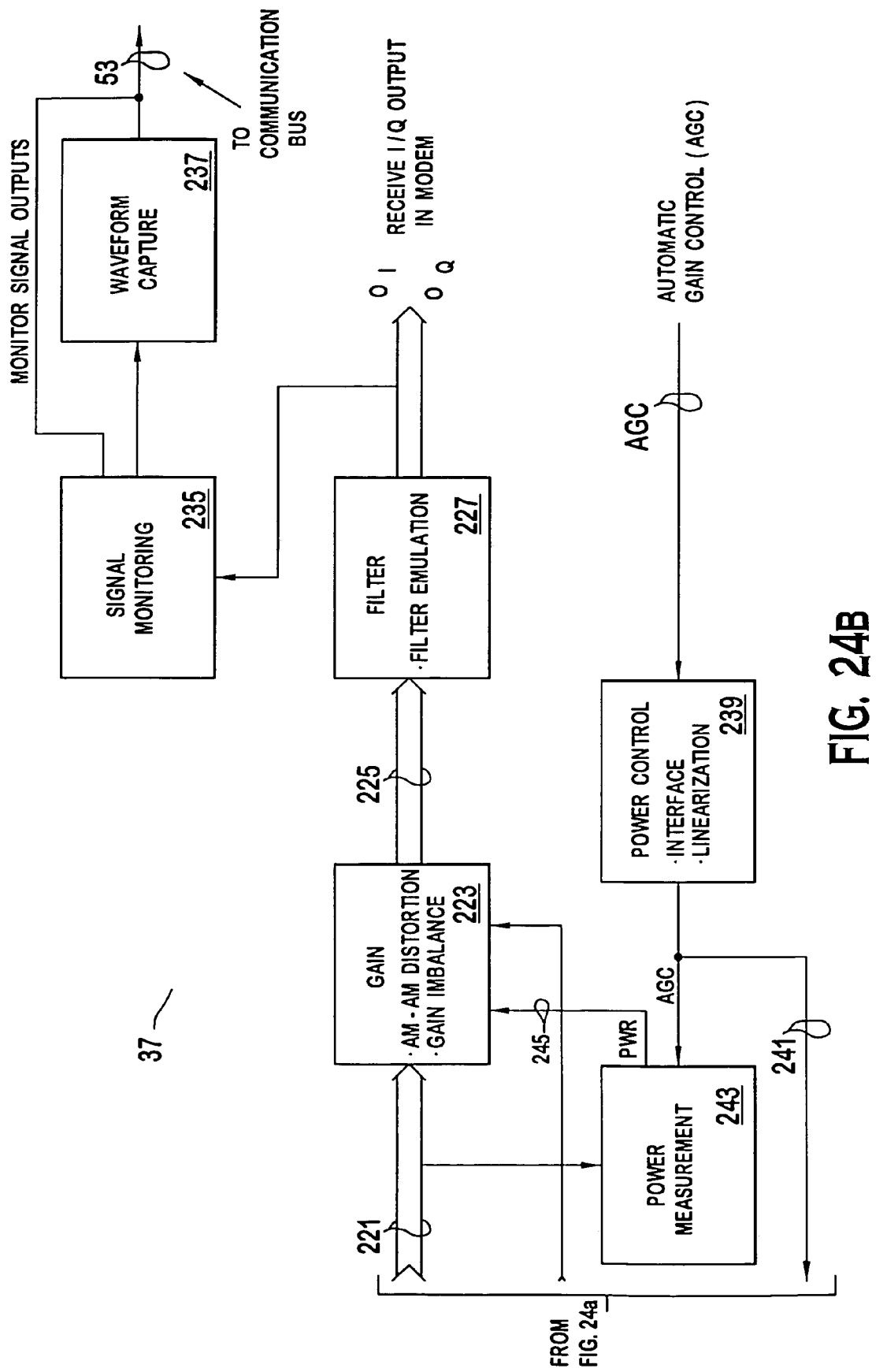

With architecture and function similar to the transmit module 35, the receive module 37 shown in FIGS. 24a and 24b accepts digital signals output from a transmit 35 $i_{I1}$, $i_{Q1}$ or media 39 $i_{I2}$, $i_{Q2}$ module via the virtual combiner/splitter 45, or by rf down-converter 43 depending upon a given simulation. The digital input signals are coupled to a signal conditioner 201 and output 203 to an addition processor 205 where the Gaussian noise and carrier dc offset impairments are performed. Gaussian noise is generated by an onboard generator 207 having an output 209 coupled to the addition processor 205 and to a phase noise generator 211. The addition processor output 213 is coupled to a filter 215 for performing the bandwidth limitation impairment. The filter output 217 is coupled to a rotation processor 219 which performs phase offset, phase noise and frequency offset and phase imbalance impairments. After rotation 221, a gain processor 223 performs AM—AM and gain imbalance impairments. The final process in the signal flow 225 is a filter emulator 227.

A power measurement processor 243 calculates the instantaneous signal power ($I^2+Q^2$) 245 for use by the gain processor 223 to perform the AM—AM impairment. The power measurement processor 243 also calculates the long term average power (of $I^2+Q^2$) for display 59, 69. A stimulus generator 229 for producing the plurality of wave shapes 231 for dynamic evaluation is coupled to the addition 205, rotation 219 and gain 223 processors. The impaired signal is output $O_I$, $O_Q$ to a receive modem demodulator (not shown). Performance measurements are captured by a signal monitor 235 and waveform capture 237 for outputting onto the communication bus 53. A bus control interface 233 bidirectionally communicates with the central microprocessor 47 via the communication bus 53 downloading impairment variables and uploading performance measurements for display or storage.

Shown in FIGS. 8a and 8b, media channel impairment modules 39 emulate the impairments of the transmission environment and nature of an application. Some simulations may be noisier than others or have noise attributes (impulse, fixed frequency, etc.) that others do not; some media impairments are not a factor in all situations. For example, a fixed point to point communication system is less affected by multipath and fading than a fast moving cellular service endures when changing location while maintaining contact with several base stations.

The media modules 39 are implemented using either a general purpose processor or a digital signal processor, or a plurality of processors. The use of digital signal processing is known to those skilled in this art. The plurality of media emulation models are stored in collateral memory with adjustment variables accessed in the same manner as the transmit 35 and receive 37 modules. Media impairments for unguided applications comprise value fluctuation such as envelope curve fading, (Rayleigh, Ricean, Nakagami, log-normal distributions and others), random FM noise, and dispersion of delay, location characteristics (logarithmic fluctuation) and distance characteristics models (Okumura, Longley-Rice and others). Impairments for guided applications comprise attenuation and delay.

Radio waves in mobile communications are subject to reflection, diffraction and scattering caused by the impact of obstacles and reflecting objects such as buildings, trees and undulations in the terrain. The resultant multiple radio waves traveling different paths can interfere with each other, causing dramatic fluctuations in signal strength. This is known as fading.

Rayleigh and Ricean models characterize the multipath phenomena that leads to intersymbol interference (ISI) caused by relative path delay. Since some of the waves arrive later than others, one version of an early data bit can actually arrive at the receiver simultaneously with or even after a later data bit that came by a shorter, more direct path. Therefore, the first bit interferes with subsequent bits. This form of ISI has a different underlying cause than ISI caused by time-smearing of bits as they pass through a bandwidth-limited channel.

Some communication media exhibit slow fading with propagation drifts over a time period of many symbols or bits, which results from atmospheric changes or topography-based change. Others have fast fading, with fast transitions during one bit period or frame period and which can corrupt a string of consecutive symbols. Neither fast nor slow fading is the same as impulse noise from lightning or the like.

Media Module Impairment Models

Rayleigh Fading

Figure 25:
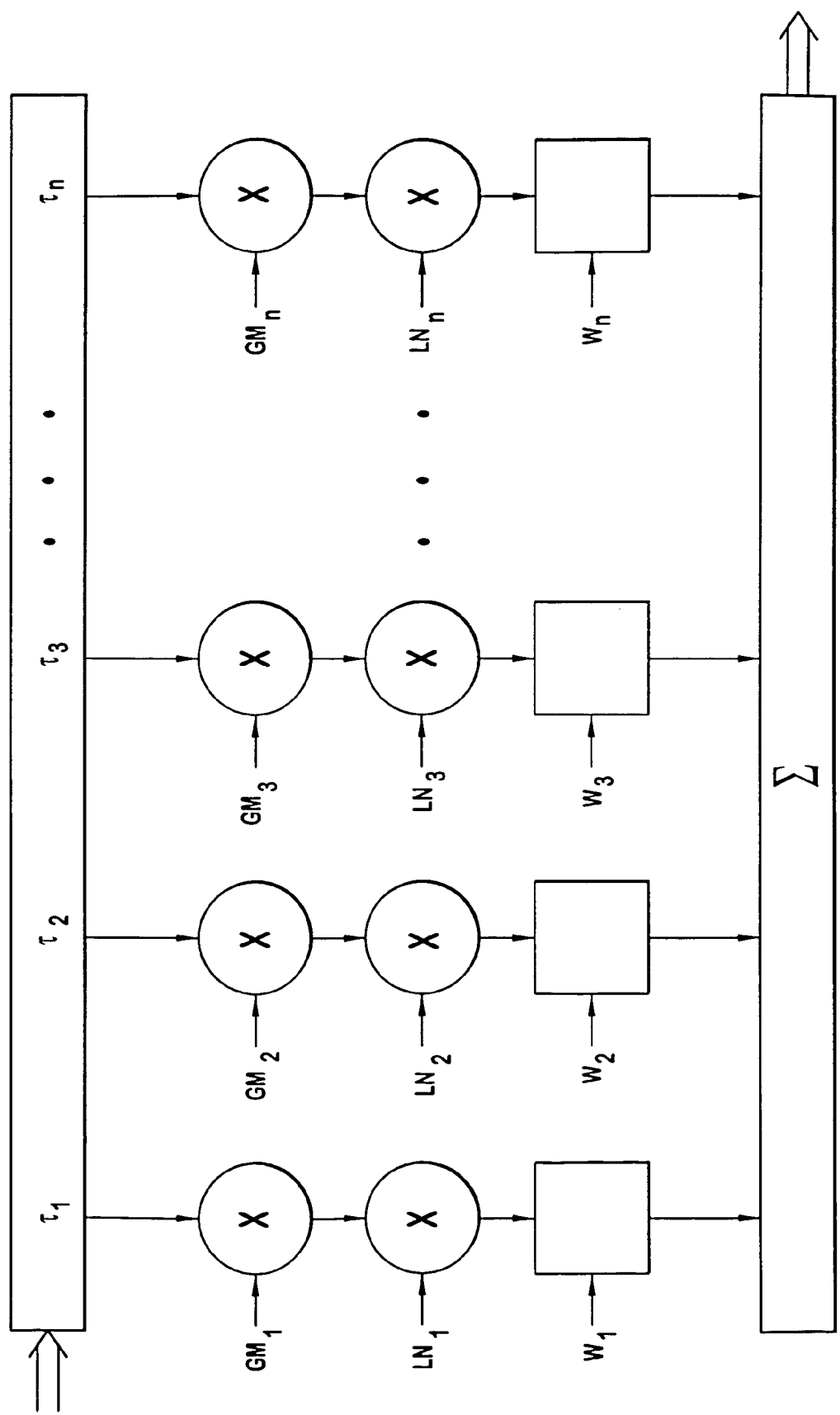
FIG. 25 is a system diagram of a programmable fading impairment model.

For unguided applications, Rayleigh-noise-distribution is modeled by emulating the multiple independent paths a signal transmitted to a receiver experiences. The receiver sees constructive and destructive interference as the sum of numerous random variables. The typical received signal clusters around a most likely value, but the signal at any time deviates narrowly or widely from this most likely value, depending on the programmable statistics of median point and number of interference waves in the channel model. The range and likelihood of deviation approximate the fading channel observed in mobile communications. Rayleigh fades of 10 to 30 dB are common and can range to 50 dB. The emulator implements fading impairments as shown in FIG. 25. A signal enters a tapped delay line having variable time delays τ with each tap output to an independent complex Gaussian modulator GM, a zero mean, log-normal modulator LN and a weighting factor W to produce the plurality of fading models. Each tap representing a multipath component. Each complex modulator may also include a plurality of delay taps, allowing for a plurality of delay profiles.

Ricean Fading

Ricean fading is modeled by contouring Rayleigh fading as a more realistic situation. This model emulates a strongly dominant path, typically a line-of-sight path in conjunction with multiple random paths. The Rayleigh model is usually associated with outdoor propagation, whereas the Ricean model is more closely associated with indoor paths.

Log Normal Distribution

Log normal models emulate a slow variation in field strength, which can occur when a receiver moves steadily away from a signal source or when there is a temporary physical block, such as a hill between a transmitter and a receiver. The blockage adds a less-than-unity coefficient to the path loss and is identified mathematically as log-normal fading.

Noise

FM noise is modeled by introducing a random noise component to each signal and the maximum Doppler frequency. A Gaussian noise source adds noise similar to that manifested during transmission. The amount of carrier-frequency shifting that a receiver observes is a function of both the relative speed between source and receiver and the nominal carrier frequency. The Doppler shift is approximately 1 kHz in most earthbound applications but can be far greater for satellite links, which have higher relative velocities.

Delay Dispersion

Delay dispersion is modeled by choosing different frequencies and delays to compensate for different frequencies having different velocities thereby having differing times of arrival.

Location Characteristics

Models for statistical topography simulation for modeling structures and topography lying between a user and base station. Variables defining median point and standard deviation over a predefined interval for the statistical model emulate differing operating environments.

Distance Characteristics

Distance characteristics are statistical approaches such as Okumura's distance curve which consider antenna height, distance between communication stations and operating carrier frequency to arrive at a model of radio wave propagation in terrestrial mobile communications. From the distance characteristics location characteristics can be obtained using normal logarithmic fluctuation along with instantaneous value fluctuation (such as Rayleigh fading).

Guided media has many degradations and inconsistencies. For guided communication links, attenuation and dispersion, rather than noise and other time-variant behaviors, are the dominant channel model.

Attenuation

Attenuation is modeled by a digital attenuator or variable gain amplifier.

Delay

Delay is modeled in unguided media as a variable representing different frequencies having different velocities. In guided media, delay is modeled as the architectural profile of a cable or waveguide.

Figure 26A:
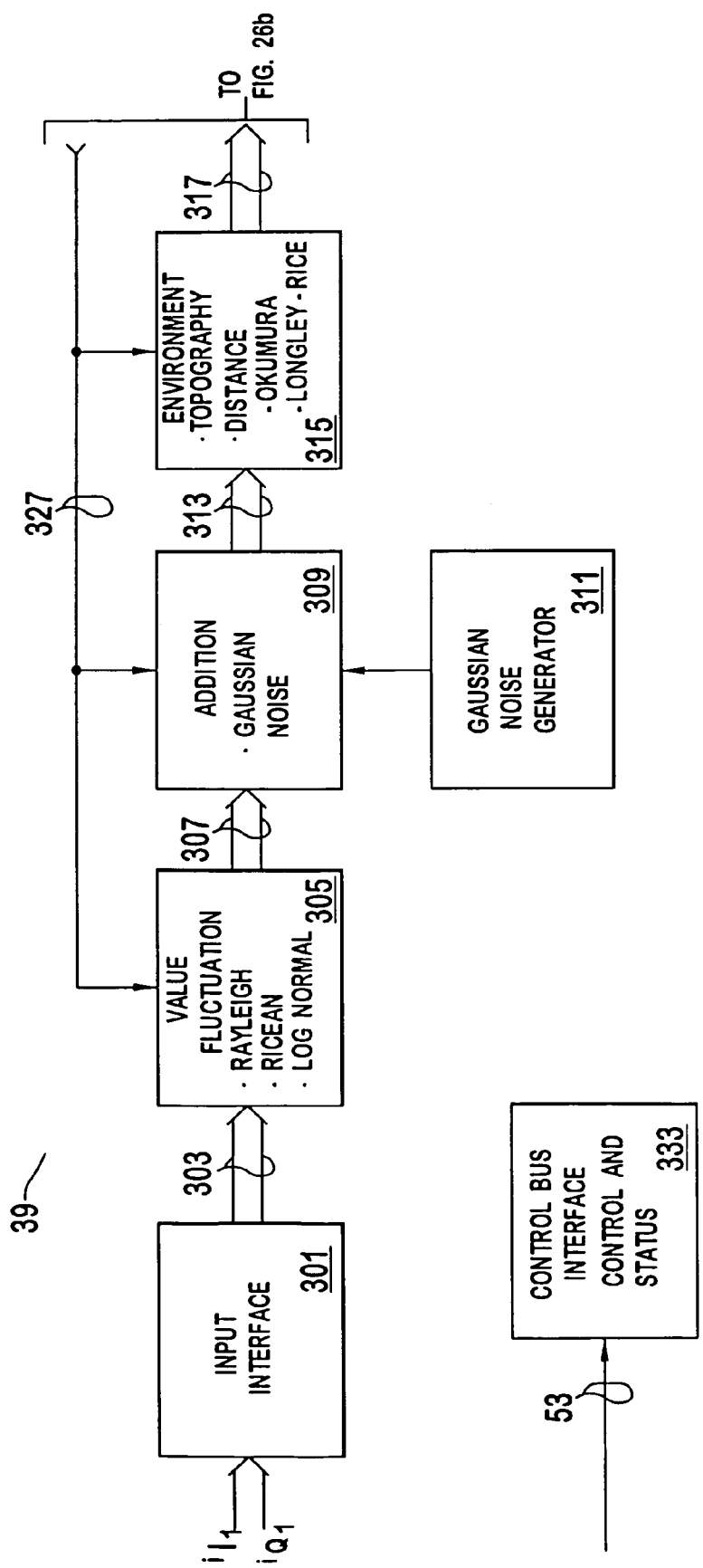
FIGS. 26a and 26b is a detailed system block diagram of a communication media module of the present invention.
Figure 26B:
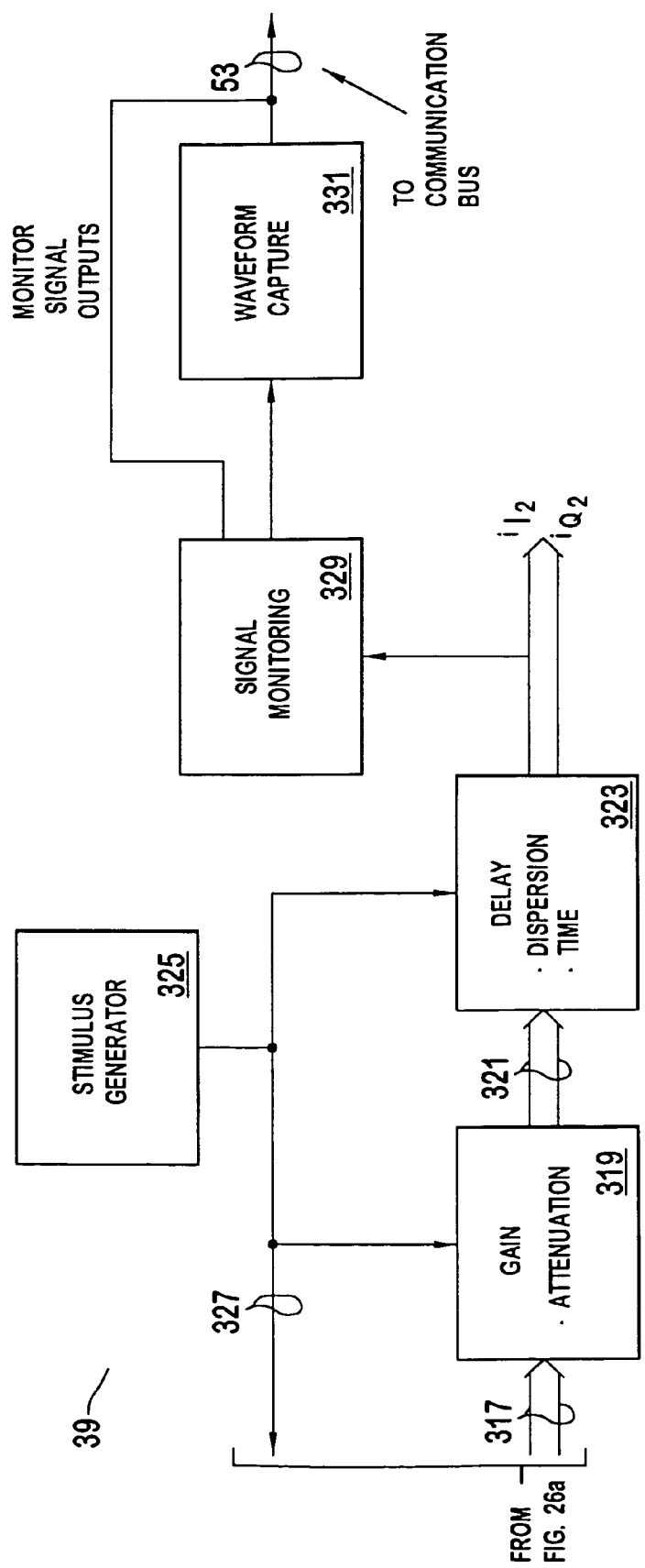

Shown in FIGS. 26a and 26b is the execution of the above media impairment models by the present invention 31 media channel module 39. A media module 39 accepts the digital signal output $i_{I1}$, $i_{Q1}$ from a transmit module 35 via the virtual combiner/splitter 45 depending upon a given simulation. The digital input $i_{I1}$, $i_{Q1}$ signals are coupled to a signal conditioner 301 and are output 303 to a programmable value fluctuation processor 305 which implements the plurality of fading models. Each fading model, i.e. Rayleigh, Ricean, log-normal, etc., is downloaded from onboard memory (not shown) into the processor 305 for a given simulation. After characterizing fading, the output 307 is coupled to an addition processor 309 where the Gaussian noise impairment is performed. Gaussian noise is generated by an onboard generator 311. The addition processor 309 output 313 is coupled to an environment processor 315 for performing the topography and distance impairments. The various distance curves are maintained in resident memory. The environment processor 315 output 317 is coupled to a gain processor 319 for attenuation impairments. The gain processor 319 output 321 is coupled to a delay processor 323 for performing the delay impairments. A stimulus generator 325 for producing the plurality of wave shapes 327 for dynamic evaluation is coupled to the value fluctuation 305, addition 309, environment (distance) 315, gain 319 and delay 323 processors. The same waveforms 327 can be applied to each delay length τ and weighting factor W verifying symbol timing recovery loops, pn tracking loops, pn acquisition performance and behavior, and rake finger multipath searches, detection, and tracking performance. The signal is output $i_{I2}$, $i_{Q2}$ to a receive module 37. Performance measurements are captured by a signal monitor 329 and waveform capture 331 for outputting onto the communication bus 53. A bus control interface 333 bidirectionally communicates with the central microprocessor 47 via the communication bus 53 downloading impairment variables and uploading performance measurements for display or storage.

The present invention 31 is taught as a modular approach for assembling a complete transmission simulation from source modem to destination modem regardless of what modulation technique or access protocol is used or any combination thereof. Embodiments of the invention that have a fixed number and type of modules can be appreciated by one skilled in this art.

While the present invention has been described in terms of the preferred embodiment, other variations which are within the scope of the invention as outlined in the claims below will be apparent to those skilled in the art.

What is claimed is:

1. An emulator for modeling a plurality of signal impairments which manifest themselves onto a communication data signal between modulation and demodulation in a communication system, the emulator comprising:
   a plurality of programmable transmit modules emulating a plurality of signal impairments that occur during communication media modulation, each said transmit module having a signal input for coupling with a transmit modem, an output and a communication bus coupling;
   a plurality of programmable receive modules emulating a plurality of signal impairments that occur during communication media demodulation, each said receive module having a signal input, an output for coupling with a receive modem and a communication bus coupling;
   a user interface communicating with a processor for defining a communication system emulation by soft coupling a required number of said transmit and receive modules in a user defined arrangement; and
   said processor instructing each of said required modules via a communication bus to use specific signal impairments from said plurality of respective signal impairments for said user defined arrangement.

2. The emulator according to claim 1 wherein said plurality of transmit module impairments further comprise linear impairments.

3. The emulator according to claim 2 wherein said transmit module linear impairments further comprise:
   amplitude imbalance;
   bandwidth group delay;
   bandwidth limitations;
   carrier frequency offset;
   carrier leakage;
   carrier phase imbalance;
   carrier phase noise;
   carrier phase offset;
   modem noise; and
   transmitter noise.

4. The emulator according to claim 3 wherein said plurality of transmit module impairments further comprise non-linear impairments.

5. The emulator according to claim 4 wherein said transmit module non-linear impairments further comprise:
amplitude modulation to amplitude modulation; and
amplitude modulation to phase modulation.

6. The emulator according to claim 5 wherein said plurality of receive module impairments further comprise linear impairments.

7. The emulator according to claim 6 wherein said receive module linear impairments further comprise:
amplitude imbalance;
bandwidth group delay;
bandwidth limitations;
carrier frequency offset;
carrier dc offset;
carrier phase imbalance;
carrier phase noise;
carrier phase offset;
modem noise; and
receiver noise.

8. The emulator according to claim 7 wherein said plurality of receive module impairments further comprise non-linear impairments.

9. The emulator according to claim 8 wherein said receive module non-linear impairments further comprise:
amplitude modulation to amplitude modulation; and
amplitude modulation to phase modulation.

10. The emulator according to claim 9 further comprising a plurality of programmable media modules emulating a plurality of signal impairments that occur during signal transmission through a communication channel media, each said media module having a signal input for coupling with the output of a transmit module, a signal output for coupling with the input of a receive module and a communication bus coupling for coupling with said communication bus.

11. The emulator according to claim 10 wherein said media module emulates guided and unguided communication channel media impairments.

12. The emulator according to claim 11 wherein said guided media impairments comprise attenuation and delay.

13. The emulator according to claim 12 wherein said unguided media impairments comprise value fluctuation, location characteristics and distance characteristics.

14. An emulator for modeling at least one signal impairment which is manifest onto a communication data signal between modulation and demodulation in a communication system, the emulator comprising:
at least one programmable transmit module emulating at least one signal impairment that occurs during communication media modulation, said at least one transmit module having a signal input for coupling with a transmit modem, an output and a processor interface;
at least one programmable receive module emulating at least one signal impairment that occurs during communication media demodulation, said at least one receive module having a signal input, an output for coupling with a receive modem and a processor interface; and
a processor, with associated memory, for configuring said transmit and receive modules via selected characteristics stored in memory.

15. The emulator of claim 14 wherein said at least one transmit module impairment emulates a dynamic impairment.

16. The emulator of claim 15 wherein said dynamic impairment comprises at least one of the following of sine waveform; swept sine waveform; square waveform; sawtooth waveform; or impulse waveform.

17. The emulator according to claim 15 wherein said transmit module linear impairments further comprise at least one of the following of amplitude imbalance; bandwidth group delay; bandwidth limitations; carrier frequency offset; carrier leakage; carrier phase imbalance; carrier phase noise; carrier phase offset; modem noise; or transmitter noise.

18. The emulator of claim 14 wherein said at least one receive module emulates a dynamic impairment.

19. The emulator of claim 18 wherein said dynamic impairment comprises at least one of the following of sine waveform; swept sine waveform; square waveform; sawtooth waveform; or impulse waveform.

20. The emulator of claim 14 further comprising at least one programmable media module emulating at least one signal impairments that occur during signal transmission through a communication channel media, each said media module having a signal input for coupling with the output of a transmit module, a signal output for coupling with the input of a receive module and a processor interface.

21. The emulator of claim 14 wherein said at least one transmit module impairment further comprises a linear impairment.

* * * * *

UNITED STATES PATENT AND TRADEMARK OFFICE
CERTIFICATE OF CORRECTION

| | | |
|---|---|---|
| PATENT NO. | : 7,013,257 B1 | Page 1 of 1 |
| APPLICATION NO. | : 09/712888 | |
| DATED | : March 14, 2006 | |
| INVENTOR(S) | : Nolan et al. | |

It is certified that error appears in the above-identified patent and that said Letters Patent is hereby corrected as shown below:

ON THE COVER PAGE

Item (56), OTHER PUBLICATIONS, page 2, right column, line 4, after the word "New", delete "approachees" and insert therefor --approaches--.

IN THE SPECIFICATION

At column 2, line 21, before the words "and $a_2$", delete "a," and insert therefor --$a_1$--.

At column 4, line 58, after "5a-5c", delete "is" and insert therefor --illustrate--.

At column 4, line 63, after "8a and 8b", delete "is" and insert therefor --illustrate--.

At column 5, line 30, after "23a and 23b", delete "is" and insert therefor --illustrate--.

At column 5, line 32, after "24a and 24b", delete "is" and insert therefor --illustrate--.

At column 5, line 36, after "26a and 26b", delete "is" and insert therefor --illustrate--.

At column 6, line 6, after "or down $43_1$", delete "$43_2,43_n$" and insert therefor --$43_2, \ldots 43_n$--.

At column 9, line 33, after the word "where", delete "±controls" and insert therefor --± x controls--.

At column 10, line 18, after the word "is", insert --X--.

At column 12, line 12, delete "Q' = qcos(A) - Qsin(A)," and insert therefor --Q' = Qcos(A) - Qsin(A)--.

Signed and Sealed this

Thirteenth Day of April, 2010

David J. Kappos
*Director of the United States Patent and Trademark Office*